US009008177B2

(12) United States Patent
 Rabii

(10) Patent No.: US 9,008,177 B2
(45) Date of Patent: Apr. 14, 2015

(54) SELECTIVE MIRRORING OF MEDIA OUTPUT

(75) Inventor: Khosro M. Rabii, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 684 days.

(21) Appl. No.: 13/323,399

(22) Filed: Dec. 12, 2011

(65) Prior Publication Data

US 2013/0148720 A1 Jun. 13, 2013

(51) Int. Cl.
| | |
|---|---|
| *H04N 7/12* | (2006.01) |
| *H04N 11/02* | (2006.01) |
| *H04N 11/04* | (2006.01) |
| *G06F 3/048* | (2013.01) |
| *G06F 3/14* | (2006.01) |
| *G06F 9/54* | (2006.01) |

(52) U.S. Cl.
CPC .............. *G06F 3/1454* (2013.01); *G06F 9/542* (2013.01); *G09G 2360/04* (2013.01); *G06F 2209/545* (2013.01)

(58) Field of Classification Search
CPC ..................................................... G06F 3/1454
USPC ..................................................... 375/240.12
See application file for complete search history.

(56) References Cited

U.S. PATENT DOCUMENTS

| | | | |
|---|---|---|---|
| 5,408,600 A * | 4/1995 | Garfinkel et al. | ............. 715/759 |
| 6,046,750 A | 4/2000 | Fitzpatrick et al. | |
| 6,385,772 B1 | 5/2002 | Courtney | |
| 7,193,660 B2 | 3/2007 | Matsubayashi | |
| 7,362,808 B2 | 4/2008 | Kang | |
| 7,515,634 B2 | 4/2009 | Chang | |
| 7,953,283 B2 | 5/2011 | Inoue | |
| 8,175,167 B2 | 5/2012 | Bouton et al. | |
| 8,213,516 B2 | 7/2012 | Kobayashi | |
| 8,416,852 B2 | 4/2013 | Matsubayashi | |

(Continued)

FOREIGN PATENT DOCUMENTS

| | | |
|---|---|---|
| EP | 2180694 A1 | 4/2010 |
| WO | 03027876 A1 | 4/2003 |

OTHER PUBLICATIONS

International Search Report and Written Opinion—PCT/US2012/064830—ISA/EPO, dated Feb. 5, 2013, 9 pp.

(Continued)

*Primary Examiner* — Hee-Yong Kim
(74) *Attorney, Agent, or Firm* — Shumaker & Sieffert, P.A.

(57) ABSTRACT

According to some aspects, this disclosure describes techniques for mirroring native media output of a source device via a different destination device. According to the techniques described herein, the source device may control the destination device to the media via an output interface associated with the destination device. The source device may receive a media element of the native media. In response to receiving the native media element, the source device may determine whether to output (mirror) the native media including the media element based on at least one parameter associated with the media element. According to other aspects, this disclosure describes techniques for preventing at least one media element from being mirrored via a destination device operating to mirror other native media. As one example, the source device may change how the source device encodes at least one region associated with the media element, in order to freeze media output associated with the at least one region.

56 Claims, 12 Drawing Sheets

(56) References Cited

U.S. PATENT DOCUMENTS

| | | |
|---|---|---|
| 8,649,438 B2 | 2/2014 | Li et al. |
| 2002/0052222 A1 | 5/2002 | Suzuki |
| 2003/0017846 A1 | 1/2003 | Estevez et al. |
| 2004/0151390 A1 | 8/2004 | Iwamura |
| 2005/0091610 A1 | 4/2005 | Frei et al. |
| 2005/0243922 A1 | 11/2005 | Magee et al. |
| 2005/0244066 A1 | 11/2005 | Huang et al. |
| 2005/0283732 A1 | 12/2005 | Menadue |
| 2007/0074266 A1 | 3/2007 | Raveendran et al. |
| 2008/0134271 A1 | 6/2008 | Qin et al. |
| 2008/0214239 A1 | 9/2008 | Hashimoto et al. |
| 2009/0044251 A1 | 2/2009 | Otake et al. |
| 2009/0162029 A1 | 6/2009 | Glen |
| 2009/0310038 A1 | 12/2009 | Jung et al. |
| 2011/0032329 A1 | 2/2011 | Bauza et al. |
| 2011/0096230 A1 | 4/2011 | Komiya et al. |
| 2011/0225542 A1 | 9/2011 | Schmieder et al. |
| 2012/0027089 A1* | 2/2012 | Chien et al. ............ 375/240.15 |
| 2012/0183039 A1 | 7/2012 | Rajamani et al. |
| 2013/0128948 A1 | 5/2013 | Rabii et al. |

OTHER PUBLICATIONS

International Preliminary Report on Patentability from International Application No. PCT/US2012/064830, 7 pp.

* cited by examiner

SELECTIVE MIRRORING OF MEDIA OUTPUT

TECHNICAL FIELD

This disclosure relates generally to devices configured to provide media output (e.g., audio and/or visual output) to one or more users.

BACKGROUND

In recent years, computing devices have steadily evolved to provide users with more and more functionality. For example, a smart phone, tablet computer, laptop computer, or other computing device may be configured to execute a plurality of different software applications that each provide functionality to a user. In some examples, such a computing device may include at least one native output interface, such as a display and/or audio speakers of the computing device.

In some examples, such a computing device may include one or more communications applications (e.g., voice call, text-messaging, electronic mail, video telephony, social networking) that cause the computing device to output one or more media elements comprising one or more messages to a user via a native output interface (e.g., a display, speakers) of the computing device. For example, a text-messaging application may receive a text message, and generate a media element (e.g., a pop-up notification and/or associated audible sound) to be output via a native output interface of the computing device to alert/inform a user of the incoming text message.

As another example, such a computing device may include one or more media applications configured to output one or more media elements such as sound (e.g., an mp3 player, digital radio station, cloud music network) and/or video (e.g., digital video player, streaming video application) via a native output interface of the computing device. According to other examples, a computing device may include one or more gaming, photo viewing, calendar, alarm, or other applications configured to cause the computing device to output native media comprising one or more media elements, via a native output interface of the computing device.

SUMMARY

This disclosure is directed to techniques for mirroring native media output, such as audio and/or visual media output, of a source device via a destination device. According to these techniques, the source device may operate in a mirroring mode such that one or more media elements of the media that are substantially similar to media elements of the native media output of the source device are output via the destination device. Also, according to these techniques, the source device may receive another media element of the media. In response to receiving the received media element, the source device may compare at least one characteristic of the received media element to at least one parameter, and determine whether to cause the destination device to mirror the at least one received media element based on the comparison.

In some examples, the source device may cause the destination device to output other native media of the source device, while preventing the received media element from being output via the destination device, until a mirroring status of the media element is resolved, (e.g., based on the at least one parameter).

According to one example, a method for mirroring native media of a source device via a destination device is described herein. The method includes receiving a first media element of the native media of the source device. The method further includes causing the destination device to mirror the native media comprising the first media element via an output interface associated with the destination device. The method further includes receiving a second media element of the native media of the source device. The method further includes determining whether to cause the destination device to mirror the native media including the second media element based on at least one parameter associated with the second media element.

According to another example, a source device configured to mirror native media of the source device via a destination device is described herein. The source device includes a mirroring module configured to: receive a first media element of the native media of the source device, cause a destination device to mirror the native media comprising the first media element via an output interface associated with the destination device, receive a second media element of the native media, and determine whether to cause the destination device to mirror the native media including the second media element based on at least one parameter associated with the second media element.

According to another example, a computer-readable storage medium that stores instructions is described herein. The instructions are configured to cause the computing device to receive a first media element of native media of a source device. The instructions are further configured to cause the computing device to cause a destination device to mirror the native media comprising the first media element via an output interface associated with the destination device. The instructions are further configured to cause the computing device to receive a second media element of the native media. The instructions are further configured to cause the computing device to determine whether to cause the destination device to mirror the native media including the second media element based on at least one parameter associated with the second media element.

According to another example, a source device configured to mirror native media of the source device via a destination device is described herein. The device includes means for receiving a first media element of the native media of the source device. The device further includes means for causing a destination device to mirror the native media comprising the first media element via an output interface associated with the destination device. The device further includes means for receiving a second media element of the native media. The device further includes means for determining whether to cause the destination device to mirror the native media including the second media element based on at least one parameter associated with the second media element.

According to another example, a method of encoding a frame of video data is described herein. The method includes identifying at least one region of a frame of video data to freeze. The method further includes assigning one of a plurality of prediction modes to each block of a plurality of blocks of video data in the video frame that reside outside of the identified at least one region. The method further includes assigning a skip prediction mode to each of the plurality of blocks within the at least one region. The method further includes outputting the frame of video data to a destination device to cause the identified at least one region to be visually frozen in the frame when the frame is output via the destination device.

According to another example, a device configured to encode a frame of video data is described herein. The device includes a mirroring module configured to: identify at least one region of a frame of video data to freeze. The device further includes a video encoder configured to: assign one of a plurality of prediction modes to each block of a plurality of blocks of video data outside of the identified at least one region; assign a skip prediction mode to each of the plurality of blocks within the at least one region; and output the frame of video data to a destination device to cause the identified at least one region to be visually frozen in the frame when the frame is output via the destination device.

According to another example, a computer-readable storage medium that stores instructions is described herein. The instructions are configured to cause a computing device to identify at least one region of a frame of video data to freeze. The instructions are further configured to cause the computing device to assign one of a plurality of prediction modes to each block of a plurality of blocks of video data outside of the identified at least one region. The instructions are further configured to cause the computing device to assign a skip prediction mode to each of the plurality of blocks within the at least one region. The instructions are further configured to cause the computing device to output the frame of video data to a destination device to cause the identified at least one region to be visually frozen in the frame when the frame is output via the destination device.

According to another example, a device configured to encode a frame of video data is described herein. The device includes means for identifying at least one region of a frame of video data to freeze. The device further includes means for assigning one of a plurality of prediction modes to each block of a plurality of blocks of video data outside of the identified at least one region. The device further includes means for assigning a skip prediction mode to each of the plurality of blocks within the at least one region. The device further includes means for outputting the frame of video data to a destination device to cause the identified at least one region to be visually frozen in the frame when the frame is output via the destination device.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
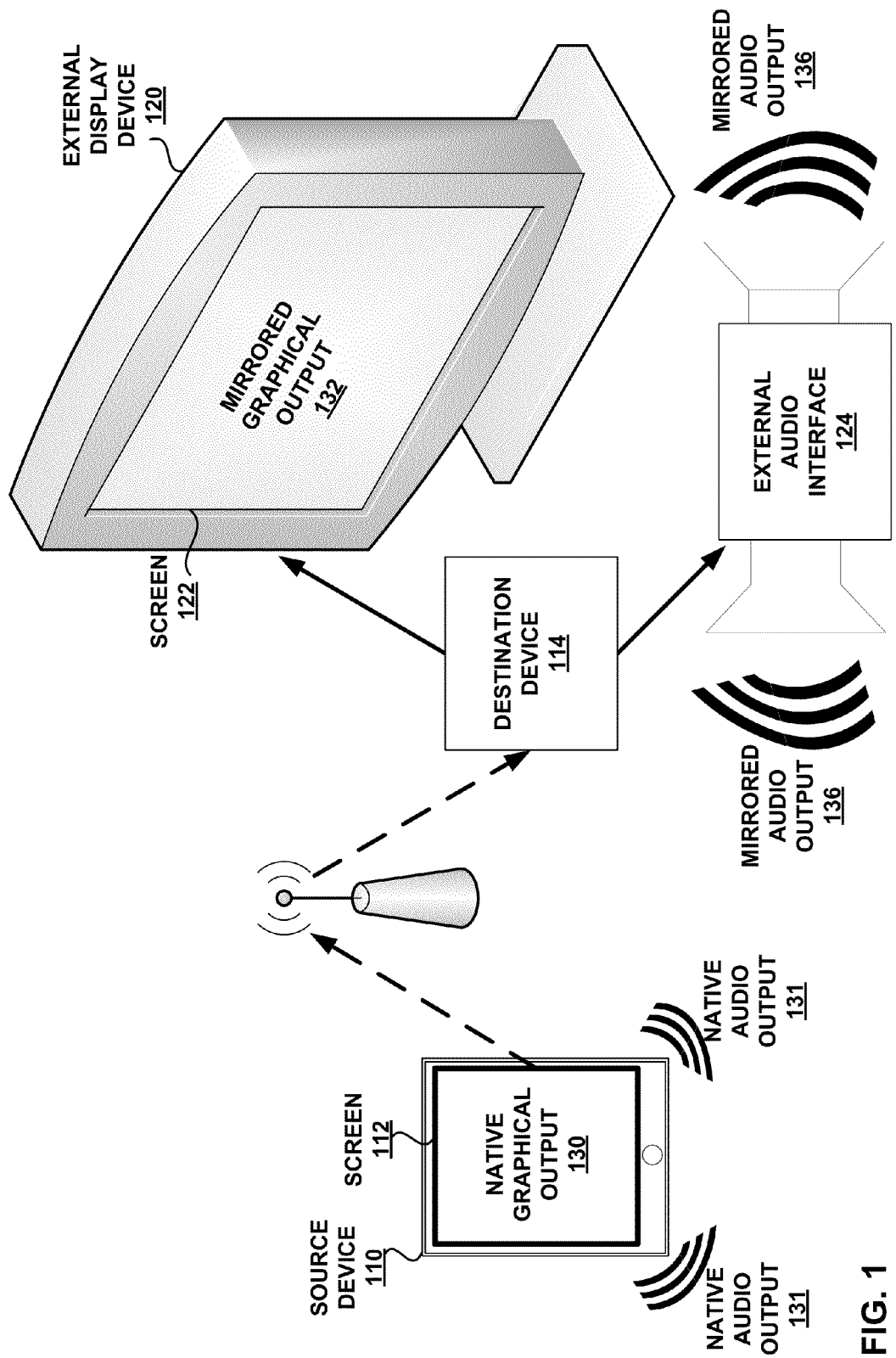
FIG. 1 is a conceptual diagram that depicts one example of a source device configured to mirror native media output of the source device via at least one destination device consistent with one or more aspects of this disclosure.

FIG. 1 is a conceptual diagram that illustrates one example of a source computing device 110 configured to control at least one destination device 114 to output native media of the source device 110 consistent with one or more aspects of this disclosure. Source device 110 may comprise any device that includes at least one native output interface configured to output media, such as audio and/or visual media. For example, source device 110 depicted in FIG. 1 comprises a smart phone or tablet computer that includes a first output interface that comprises a display screen 112, and a second output interface that comprises one or more speakers (not depicted in FIG. 1) native to the source device. In other examples, source device 110 may comprise a laptop computer, desktop computer, gaming controller, or any other device that includes or is configured to control at least one native output interface source device 110.

As shown in the example of FIG. 1, screen 112 of source device 110 may be configured to output native graphical output 130. Native graphical output 130 may comprise, for example, one or more still or video images. As also shown in the example In the example of FIG. 1, speakers of source device 110 are configured to provide native audio output 131. Native audio output 131 may comprise one or more audible sounds. Such audio output 131 may be associated with (e.g., configured to be output in conjunction with) graphical output 130. For example, where native graphical output 130 comprises video or image content, audio output 131 may comprise audible sounds associated with the video or image.

As shown in FIG. 1, source device 110 is communicatively coupled to at least one destination device(s) 114 (hereinafter "destination device 114"). Destination device 114 may be used by source device 110 to operate one or more output interfaces 120, 124 associated with the destination device 114, to mirror native media output of the source device 110. The term "mirror" as described herein may refer to controlling, by source device 110, at least one destination device 114 to output at least a portion of native media, such as native audio, video, and/or image media output of the source device 110.

Source device 110 may control destination device 114 to mirror media output of source device 110 via one or more output interfaces 120, 124 associated with destination device 114. For example, as shown in FIG. 1, source device 110 may control external display interface 120 to output mirrored graphical output 132, which may comprise substantially similar graphical output to native graphical output 130 of source device 110. Mirrored graphical output 132 may comprise the same one or more images as native graphical output 130, but such images may be processed, sized, formatted, and/or otherwise modified for presentation via external display interface 120.

As also shown in FIG. 1, source device 110 may control external audio interface 124 to output mirrored audio output 136, which may comprise substantially similar audio output to audio output 131 depicted in FIG. 1. Mirrored audio output 136 may comprise the same audible sounds as native graphical output 130, but processed, formatted, and/or otherwise modified to be output via external audio interface 124. In some examples, source device 110 may control destination device 114 to output media comprising native graphical output 130 as well as native audio output 136 of source device 310.

In some examples, such as shown in FIG. 1, destination device 114 may comprise a device that is coupled to one or more of an external display interface 120, such as a television display, computer monitor, or the like, that includes a screen 122 configured to present images to a viewer, and/or an external audio interface 124, such as speakers or a stereo system. For example, destination device 110 may comprise a set-top box (e.g., GOOGLE TV, APPLE TV, ROKU), gaming console (e.g., NINTENDO WII, SONY PLAYSTATION 3, MICROSOFT XBOX), digital video disc (DVD) player, BLURAY player, or other separate unit coupled to an external display device and/or an external audio device as shown in the example of FIG. 1. In other examples not depicted in FIG. 1, one or more of destination device 114, external display interface 120, and/or external audio interface 124 may be combined as a single device. For example, a display device, such as a television or computer monitor, may include both a screen 122 and one or more speakers. In other examples, the same, or different, destination devices 114 may control one or more audio or video output interfaces that are separate from the one or more destination devices 114. According to still other examples, the functionality performed by destination device 114 as described herein may be performed by one or more of an external display device and/or an external audio device. For example, a television display and/or stereo receiver may include hardware and/or software configured to communicatively couple the television and/or stereo with source device 110, such that native media of source device 110 may be mirrored the television display or stereo receiver.

In some examples, source device 110 may be communicatively coupled to destination device 114 to mirror media output of source device 110 via a wired connection, such as one or more of a high definition multimedia interface (HDMI), digital video interface (DVI), or other wired connection. In other examples, source device 110 may be coupled to destination device 114 to mirror media output wirelessly. For example, destination device 114 may include one or more communications components configured to enable the source device to send native media output to the destination device via one or more wireless communications protocols, such as WI-FI, BLUETOOTH, a cellular network, or any other form of wireless communications.

As described above, source device 110 may be configurable to mirror media output of source device 110 via destination device 114. For example, source device 110 may provide a user with a user-selectable option to activate or deactivate a mirroring mode where native audio media, visual media, or both are output via destination device 114. In a standard operating mode, source device 110 may receive media in the form of a plurality of media elements, and control one or more native output interfaces 112, 131 of source device 110 to output media comprising the plurality of media elements. In such a mirroring mode, destination device 114, source device 110 may control destination device 114 to output substantially the same media as native graphical output 130 and/or native audio output 131 that source device 110 would have output using one or more native output interfaces 112, 131 in the standard operating mode. For example, in such a mirroring mode, as source device 110 receives media elements from one or more sources (e.g., from one or more software applications executing on the source device), source device 110 may process the received media elements for output via destination device, and send each of the processed media elements to the destination device 114 to be output. When operating to mirror media output, source device 110 may or may not itself continue to output native media 130, 131 via native output interfaces 130, 131.

This disclosure is directed to techniques for controlling the mirroring of media output of source device 110 via one or more destination device(s) 114. According to these techniques, when operated in a mirroring mode, source device 110 may selectively prevent one or more received media elements from being mirrored via destination device 114. For example, source device 110 may receive a first media element of native media, and control destination device 114 to mirror the native media including the first media element of native media via the destination device 114. Source device 110 may also receive a second media element of the native media. In response to receiving the second media element, source device 110 may compare at least one characteristic of the second media element to at least one parameter. Based on the comparison, source device 110 may determine whether or not to mirror the second media element via the one or more destination devices 114. In some examples, source device 110 may control destination device 114 to continue mirroring media without mirroring the second media element, while source device 110 determines whether or not to mirror the second media element. For example, source device 110 may cause destination device 114 to continue outputting video and/or audio of the first media element of the native media, but not video and/or audio associated with the second media element.

As one non-limiting example, the first media element may comprise output of a digital video player application executing on source device 110, which outputs the first media element. In response to the first media element, source device 110 may control destination device 114 to output video and/or audio associated with the first media element. Source device may then receive a second media element. According to this example, the second media element may comprise a message from a communications application executing on source device 110. For example, the second media element may comprise an indication that an email, text-message, voice call, voicemail, or other message has been received from one or more messaging, telephony, social networking, or other applications. According to the techniques of this disclosure, upon receipt of the second media element, source device 110 may compare at least one characteristic of the second media element to at least one parameter, to determine whether to control destination device 114 to present the second media element based on the comparison. According to the techniques described herein, a user or other viewer may continue viewing video media comprising the first media element (the played back video) as well as audio media associated with the first media element (an audio track associated with the video), but not mirror audio or video media associated with the received second media element, which may be private and/or person to the user, or otherwise undesirable to share via destination device 114. Instead, the second media element may only be displayed via a native output interface of source device 110. As such, another user with access (e.g., to view and/or listen to) to one or more output interfaces of destination device 114 may not be given access to the first media element. In this manner, the user of source device 110 may be able to share some native media of source device 110 (e.g., the video and associated audio playback described above) on a selective basis, while maintaining confidentiality of other media or otherwise preventing mirroring of media that the user does not desire to share with others, such as the incoming message.

In some examples, source device 110 may determine whether to mirror a received media element (a "mirroring status" of the media element, as described herein) based on at least one parameter that comprises a predetermined parameter stored in memory. For example, source device 110 may operate to provide a user-interface that a user may use to pre-select one or more options regarding the mirroring of media via one or more destination devices 114 as described herein. For example, source device 110 may provide a user interface that allows a user to select application-specific options regarding the mirroring of media. As one specific example, where the second media element is received from a communications application, source device 110 may provide a user interface that enables a user to indicate that all media received from the communications application should be mirrored, that no media received from the communications application should be mirrored, and/or that media associated with a message from one or more specific users should or should not be mirrored. In other examples, such a user interface may also enable a user to indicate that source device 110 should request and receive user input to authorize media received from one or more applications or users.

Based on such one or more predetermined parameters stored in memory, source device 110 may determine whether or not to mirror the received second media element via the destination device 114. For example, if such a predetermined parameter indicates that all messages from user "John Smith" are to be prevented from being mirrored, source device 110 may not output a received second media element that comprises a text message or voice call from user "John Smith" via the destination device.

According to other examples consistent with the techniques described herein, source device 110 may determine whether or not to mirror, via destination device 114, a second multimedia element based on one or more dynamically determined parameters. For example, in response to receiving the second media element, source device 110 may provide a user-interface that allows a user to select whether or not to mirror the received second media element. In some such examples, source device 110 may not operate to mirror the second media element via destination device 114, unless a mirroring status of the second media element is resolved. For example, source device 110 may not mirror the second media element, unless source device 110 determines based on the at least one parameter that the second media element should be mirrored. In some examples, while source device 110 determines a mirroring status of the second media element, source device 110 may continue to mirror other native media output of source device 110 via destination device 114, without mirroring the second media element. For example, source device 110 may continue to mirror audio output associated with the first media element via destination device 114, but not mirror audio output associated with the second media element. As another example, source device 110 may cause destination device 114 to mirror media comprising native graphical media of source device 114 with at least one region of the mirrored graphical media that corresponds to the second media element frozen or removed from the mirrored media output.

The techniques described herein may be advantageous, because when source device 110 is operated in a mirroring mode to mirror native media of the source device 110 via destination device 114, source device 110 may provide a user with an ability to control whether one or more received media elements of native media are mirrored via the destination device 114. Such control may be desirable to a user, because a user may desire to mirror some, but all, native media of source device 110, in order to maintain confidentiality and/or avoid mirroring at least some irrelevant elements, of some media native to the source device 110. The techniques described herein may further advantageously enable a user to control mirroring of newly received native media elements, while still allowing the user and/or another viewer to continue to enjoy other native media of the source device 110 that the user does desire to be mirror via destination device 114. In this manner, a user experience when using source device 110 to mirror native media via destination device 114 may be improved.

Figure 2:
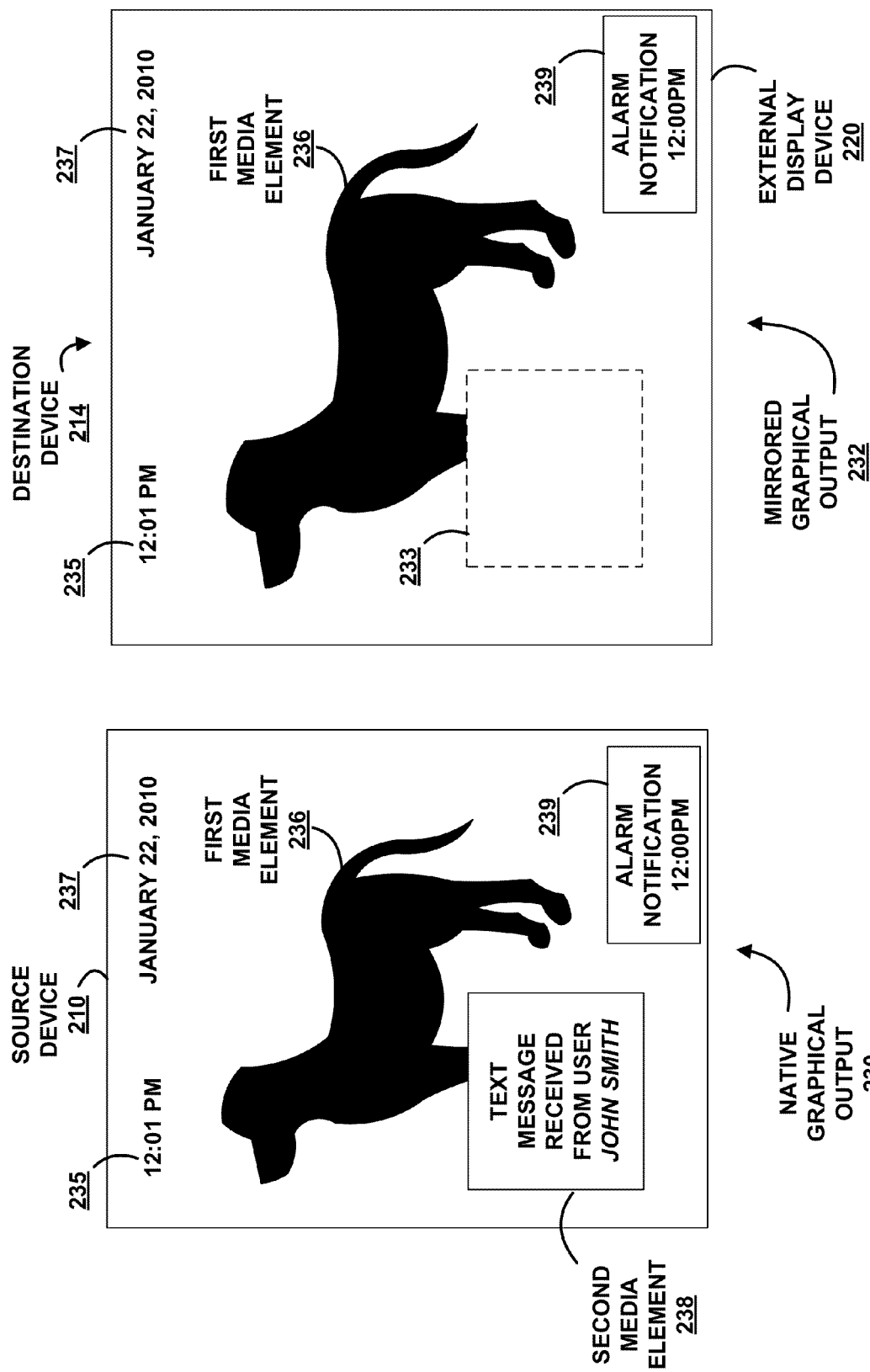
FIG. 2 is a conceptual diagram that illustrates screen shot examples of media output by a source device and a destination device consistent with one or more aspects of this disclosure.

FIG. 2 is a conceptual diagram that depicts a screen shot of one example of native graphical output 230 of a source device 210, as well a screen shot of one example of mirrored graphical output 232 of an external display interface 220 associated with a destination device 214 consistent with one or more aspects of this disclosure. As shown in FIG. 2, source device 210 is operated to output native media output (graphical output 230 in the example of FIG. 2) that comprises a plurality of media elements 235, 236, 237, and 239. Source device 210 may also operate to output audio media via one or more native speakers associated with the source device 210 (included in source device 210 or coupled to source device 210). The plurality of media elements 235, 236, 237, and 239 may be received from any source, such as one or more software applications executing on source device 210.

For example, as shown in FIG. 2, media first element 236 is an image of a dog. First media element 236 may comprise a video or still image received from a media display application, such as, for example, a video player or photo viewing application. As also shown in FIG. 2, media element 235 comprises a digital clock, and media element 239 comprises an alarm. Media elements 235 and 237 may be received from a clock and/or alarm application executing on source device 210. As also shown in FIG. 2, media element 237 comprises a current date. Media element 237 may be received from a calendar application executing on source device 210. Although not depicted in FIG. 2, in some examples, source device 210 may also output audio media associated with one or more of media elements 235, 236, 237, and 239.

As also shown in FIG. 2, source device 210 may operate to control destination device 214 to mirror media output (e.g., native graphical output 230 in the example of FIG. 2, as well as native audio output, not depicted in FIG. 2) of source device 210. For example, as shown in FIG. 2, display interface 220 is operated to present mirrored graphical output 232 comprising substantially similar media as native graphical output 230. For example, as shown in FIG. 2, media elements 235, 236, 237, and 239 may be output substantially similar to native graphical output 230, albeit processed (e.g., reformatted, resized, reshaped, rearranged, reoriented, and/or otherwise modified) for presentation via external display interface 220.

As also depicted in the example of FIG. 2, while source device 210 is operated to present native graphical output 230 comprising media elements 235, 236, 237, and 239 (and destination device 214 is operated to mirror media elements 235, 236, 237, and 239), source device 210 may receive second media element 238. In the example of FIG. 2, second media element 238 comprises a graphical notification that source device 210 has received a text message from a user named "John Smith," however second media element may comprise any form of media, including any visible and/or audible media. According to the techniques described herein, before source device 210 controls destination device 214 to output second media element 238, source device 210 resolve a mirroring status of the second media element 238. For example, source device 210 may compare one or more characteristics of second media element 238 to at least one parameter, and determine whether or not to mirror the second media element 238 via destination device 214 based on the comparison. In some examples, while the mirroring status of the second media element 238 is being resolved, source device 210 may output the second media element 238 via one or more native audio or display interfaces native to the source device 310, as shown in the example of FIG. 2.

In some examples, source device 210 may resolve a mirroring status of second media element 238 based on at least one predetermined parameter stored in memory. For example, source device 210 may provide a user-interface that a user may use to pre-select one or more options regarding the mirroring of, e.g., particular media elements, types of media elements or categories of media elements. Source device 210 may store an indication of one or more such selected options in memory as a parameter for later use to determine whether to mirror media elements received by source device 210 and thereby resolve a display status of one or more received media elements.

As one example, such a user interface may enable a user to select one or more options based on a type of source a media element is received from. For example, such a user interface may enable a user to indicate that all media element received from communications applications (e.g., electronic mail, text messaging, video telephony, social networking applications), or all video applications is or is not to be mirrored via a destination device. As another example, source device 110 may provide a user interface that allows a user to select application-specific options regarding the mirroring of media. For example, such a user interface may enable a user to indicate that media received from one or more specific applications, such as a specific text-messaging or a specific video application, should or should not be mirrored via the destination device. According to still other examples, such a user interface may enable a user to select user-specific options regarding the mirroring of media. For example, such a user interface may enable a user to indicate that all media associated with a particular user, or media from one or more specific types of application or specific application associated with a particular user, should or should not be mirrored via the destination device. As one specific example, such a user interface may enable a user to indicate that all media, or media received by one or more types of application or specific applications, should or should not be mirrored via the destination device. In some examples, source device 210 may resolve a display status of a received media element, such as second media element 238 depicted in FIG. 2, by comparing at least one characteristic of the received media element to at least one predetermined parameters, based on user input received via one or more user interfaces as described above.

In other examples, source device 210 may resolve a display status of a received media element based on one or more dynamically determined parameters. For example, in response to receiving second media element 238, source device 210 may present a user with a user interface that enables the user to select whether or not to mirror the received second media element 238 via destination device 214. For example, source device 210 may, via one or more native media interfaces of source device 210 (e.g., screen 212 depicted in FIG. 2 and/or speaker associated with source device 210), output second media element 238 along with an associated user interface that allows a user to select whether to 1) mirror the second media element 238 via destination device 214, or 2) prevent the second media element 238 from being mirrored (while continuing to output the second media element 238 via one or more native media interfaces of source device 210). As one specific example, such a user interface may state "Allow mirroring of text message from John Smith on external display?", and may enable a user to select yes or no. In some examples, source device 210 may resolve a display status based on one or more dynamically determined parameters that are defined based on user input received in response to such a user interface. In some examples, a source device 210 may also resolve a mirroring status of a received display element user interface input that dismisses the received second media element 238 entirely. According to these examples, a user may interact with source device 210 to cause the second media element 238 to be removed from native media output of source device 210.

As described above, in some examples, source device 210 may not control destination device 214 to mirror second media element 238, until a mirroring status of second media element 238 is resolved by source device 210. For example, source device 210 may cause destination device 214 not to mirror second media element 238, unless source device 210 determines that second media element 238 should be mirrored based on comparison to at least one predetermined or dynamically determined parameter, as described above.

In some examples, until a mirroring status of a received media element is resolved, source device 210 may cause destination device 214 to stop actively mirroring at least a portion of media of native graphical output 230. For example, source device 210 may cause destination device 214 to mirror audio media associated with first media element 236 (i.e., an audio track associated with an image associated with first media element), but not mirror audio media associated with second media element 238.

Source device 210 may cause destination device 214 to mirror video media associated with first media element 236, but not mirror video media associated with second media element 238. For example, source device 210 may prevent second media element from being output by destination device 214 by causing at least a portion of graphical output of destination device to be visually "frozen," e.g., by repeating a given frame of video, image or graphical data, or by stopping destination device 214 from outputting audio and/or visual media altogether, until a mirroring status of second media element 238 is resolved.

For example, source device 210 may freeze an entire frame of mirrored graphical output 232 by continually sending destination device 214 data representing a previously presented frame that does not include second media element 238, or by sending one or more commands to destination device 214 that instruct destination device 214 to modify processing of received media to output a "frozen" frame. According to another example, source device 210 may stop sending audio and/or visual media to destination device 214, and thereby stop destination device 214 from outputting audio and/or visual media altogether.

According to some aspects of this disclosure, source device 210 may continue to control destination device 214 to mirror some native media output of source device 210, but not other native media output of source device 210. Referring to the example of FIG. 2, source device 210 may continue to cause destination device 214 to mirror native graphical media output comprising first media element 236 (and/or media elements 235, 237 and 239), and not mirror native graphical media output comprising second media element 238 by removing and/or freezing at least one region of the mirrored graphical media associated with the second media element 238. In some examples, source device 210 may also mirror native audio media output of source device 210 associated with first media element 236 (and/or media elements 235, 237 and 239), and not mirror native audio media output associated with second media element 238.

Referring to FIG. 2, first media element 236 comprises an image (picture as opposed to a video sequence) of a dog. As shown in the example of FIG. 2, a left bottom-most portion of first media element 236 (i.e., the front legs of the image of the dog, not shown in FIG. 2) is not displayed in order to prevent second media element 238 from being displayed.

In some examples, until a mirroring status of second media element 238 is resolved, source device 210 may not cause region 233 to be removed from mirrored graphical output 232 as shown in the example of FIG. 2. Instead, source device 210 may cause region 233 of mirrored graphical output 232 to include an image from at least one previous frame that did not include second media element 238. In this manner, source device 210 may visually "freeze" previous image data that corresponds to region 233, which may minimize disruption of the display of other media, such as media elements 235, 236, 237, and 239 of mirrored graphical output 232 depicted in FIG. 2. Accordingly, if a user used source device 210 to mirror a still photo of a dog via destination device 214 as shown in the example of FIG. 2, a bottom left most portion of first media element (corresponds to the front legs of the dog image, not visible in the example of FIG. 2) may still be displayed and viewable by the user.

In some examples, to cause region 233 associated with second media element 238 to be visually "frozen" based on previously displayed image data as described above, source device 210 may send one or more commands to destination device 214 that cause destination device 214 to modify it's operation to repeatedly read image data to output images associated with region 233, while using received image data to mirror other native media of source device 210.

In some examples, such a command may comprise an in-band signal, communicated within a frequency band of a communications link between source device 310 and the destination device that is used to mirror media. For example, where the communications link comprises a WI-FI communications link, such a command may be communicated within the frequency band of the WI-FI signal.

According to other examples, such a command may comprise an out-of-band signal. For example, where the communications link comprises a WI-FI communications like, such a command may be communicated using a different frequency band than defined for the WI-FI signal, and/or using a different wireless protocol. For example, such a command may be communicated using one or more low power communications protocols, such as a BLUETOOTH communications protocol.

For example, source device 210 may communicate one or more out-of-band signals to destination device 214, to cause destination device 214 to modify its operation to process images associated with region 233 differently than portions of mirrored graphical data displayed outside of region 233.

According to other examples, source device 210 may modify how native media, such as native graphical output 230, is processed by source device 210 to generate mirrored graphical output 232 such that second media element 238 is not included in mirrored graphical output 232 when output via destination device 214. For example, as described in further detail below with reference to FIGS. 8-11, source device 210 may modify how graphical data is encoded by source device 210, such that when the graphical data is decoded by destination device 214, the mirrored graphical media is presented with region 233 visually frozen, as described above.

According to the techniques described herein, when operated in a mirroring mode, source device 210 may provide a user with an ability to keep certain media, such as second media element 238, confidential from other viewers of an output interface associated with destination device 214. In addition, according to the techniques described herein, source device 210 may enable prevent received media native to source device 210 from being mirrored via destination device, while minimizing interruption of the user's ability to enjoy other media native media of source device 210 mirrored via destination device 214.

Figure 3:
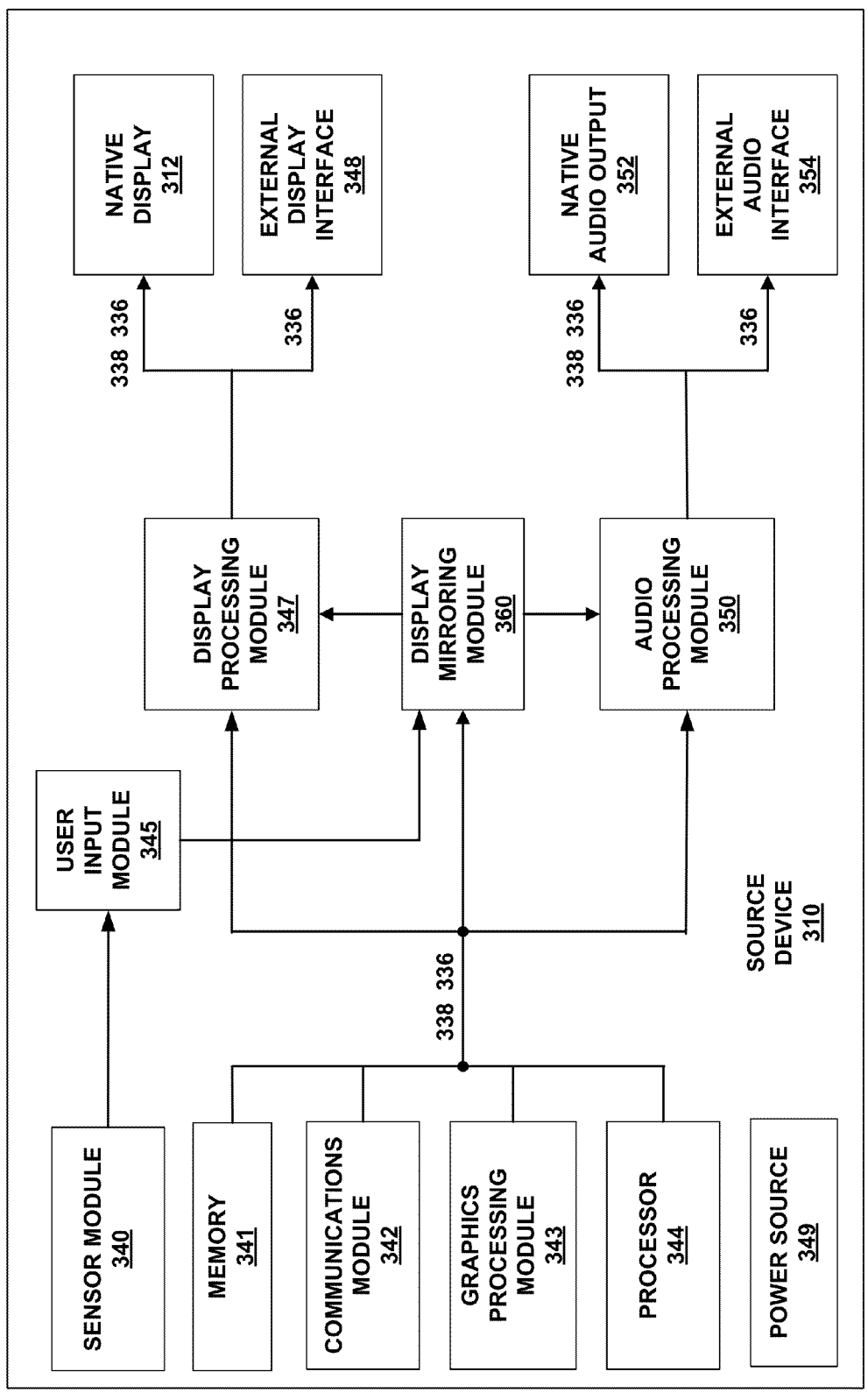
FIG. 3 is a block diagram that illustrates one example of a source device configured to mirror native media output of the source device via at least one destination device consistent with one or more aspects of this disclosure.

FIG. 3 is a block diagram that illustrates one example of a source device 310 configured to mirror native media output via at least one destination device (e.g., destination device 114, 214 depicted in FIGS. 1 and 2, respectively) consistent with one or more aspects of this disclosure. As shown in FIG. 3, device 210 includes a sensor module 340, a user input module 345, a memory 341, a communications module 342, a graphics processing module 343, a processor 344, a native display screen 312 and a power source 349. Processor 344 may include one or more components of device 310 configured to execute instructions. For example, processor 344 may comprise one or more central processing units (CPU), application specific integrated circuits (ASICs), field programmable gat arrays (FPGAs), discrete logic components, or other component configured to execute instructions that control operation of device 310.

Memory 341 comprises one or more components of device 310 configured to store data and/or instructions, such as one or more magnetic storage components, optical storage components, random access memory (RAM) storage components, FLASH memory storage components, or any other component configured to store instructions and/or data. For example, memory 341 may store one or more software programs that to operate device 310 to output media. Memory 341 may also or instead be configured to store data that represents media that may be output by device 310. For example, memory 310 may store one or more digital representations of audible sounds, still images, video, or other media that may be output by device 310.

Communications module 342 may comprise one or more hardware and/or software components of device 310 configured to enable device 310 to communicate with one or more other devices. For examples, communications module 342 may comprise one or more components that enable one or more of wireless communication (e.g., WI-FI, BLUETOOTH, cellular network (e.g., 3G, 4G cellular network) or wired communication (e.g., ETHERNET). In some examples, communications module 342 may be used by device 310 to control another device, such as destination device 114 depicted in FIG. 1, to mirror native media output of device 310. For example, source device 310 may be coupled to the destination device via communications module 342 such that source device 310 may communicate data and/or instructions that cause the destination device to mirror data according to the techniques described herein.

Sensor module 340 may comprise one or more hardware and/or software components of device 310 that operate one or more sensors (not depicted in FIG. 2) of device 310. For example, sensor module 340 may comprise one or more hardware and/or software components of device 310 configured to operate one or more microphones, image sensors (e.g., camera sensor), accelerometer sensor, gyroscope sensor, single or multi-touch display sensors configured to detect user gestures performed at screen 312 or another portion of device 310, or any other type of sensor that device 310 may include.

Graphics processing module 343 may comprise one or more hardware and/or software components of device 310 configured to process graphics instructions (e.g., higher level graphics instructions such as, for example, one or more instructions according to the OPENGL standard) and generate image data that may be used to present images via screen 312. For example, graphics processing module 343 may comprise a graphics processing unit (GPU) and/or other components configured to process graphics. In some examples, graphics module 343 may process graphics based on graphics instructions received from one or software applications executing on processor 344. In other examples, graphics module 343 may process graphics based on graphics instructions received from memory 341 and/or communications module 342.

Power source 349 may comprise one or more components of device configured to store energy, such as electrical energy, that may be used to power one or more components of device 310. For example, power source 349 may comprise one or more batteries internal to device 310 that may be used to power device 310 when device 210 is not connected to an external power source, such as a wall outlet. In some examples, power source 349 may be a limited power source. In some examples, it may be desirable to decrease an amount of energy stored by power source 349 that is used to operate device 310, such that device 310 may be used for longer periods of time between being charged (e.g., by being connected to an external power source).

As also shown in FIG. 3, device 310 includes a user input module 345. User input module 345 may comprise one or more hardware and/or software components of device 310 configured to receive and/or process one or more indications of sensed information from sensor module 440, and communicate one or more indications of the sensed information to one or more other components of device 310. For example, user input module 345 may receive one or more indications of user interaction with screen 312, and determine that a user has performed one or more single and/or multi-touch gestures at screen 312 (and/or another surface of device) based on the indication of detected user interaction. According to this example, user input module 345 may send an indication of the determined single or multi-touch gesture to one or more other components of device 310. For example, user input module may send such an indication to one or more software applications executing on processor 344. The one or more software applications may control device 310 in response to such a received indication.

As depicted in FIG. 3, device 310 may also include a display processing module 347 and an audio processing module 350. Display processing module 347 may be configured to receive, from one or more sources such as memory 341, communications module 342, graphics processing module 343, and/or one or more software applications executing on processor 344, image data that represents one or more media elements that represent one or more images for display. Display processing module 347 may be configured to process such received data for presentation via one or more displays. For example, as depicted in FIG. 3, display processing module 347 may process image data to control a native display 312 of source device 310.

Display processing module 346 may also direct and/or process received image data to control one or more displays external to source device 310. For example, display processing module 346 may, via external display interface 348, control at least one display external to source device 310 (e.g., external display interface 120 communicatively coupled to destination device 114 depicted in FIG. 1). As one example, display processing module 346 may process image data to be sent to one or more external displays in a format catered to operation of the one or more external displays, in order to mirror graphical output media of source device 310 in a visually pleasing manner. For example, display processing module 346 may process the image data to mirror native graphical output to modify resolution or contrast, resize, reshape, reorient, rearrange, or otherwise modify image data to be output by one or more displays external to source device 310 in a visually pleasing manner.

As also depicted in FIG. 3, source device includes an audio processing module 350. Audio processing module 350 may process received image data to control one or more speakers external to source device 310. For example, audio processing module 350 may, via external audio interface 354, control at least one speaker (e.g., external audio interface 130 depicted in FIG. 1) communicatively coupled to and controlled by another device (e.g., destination device 114 depicted in FIG. 1). Audio processing module 350 may process audio data to be sent to one or more external audio interfaces to mirror native audio media output of source device 310. For example, audio processing module 350 may process the image data by modifying a bit rate, volume, audio encoding technique, or other characteristic of audio data for output via one or more speakers external to source device 310.

As also depicted in FIG. 3 source device 310 includes a mirroring module 360 consistent with one or more aspects of this disclosure. Generally speaking, mirroring module 360 may comprise any combination of hardware and/or software components that are configured to control whether one or more media elements received by display processing module 347 and/or audio processing module 350 are mirrored via a destination device consistent with one or more aspects of this disclosure. For example, in response to receiving a new media element from one or more sources (e.g., memory 341, communications module 342, graphics processing module 343, and/or one or more software applications executing on processor 344), mirroring module 360 may compare at least one characteristic of the received media element to at least one parameter. Based on the comparison, mirroring module 360 may resolve a display status for the media element based on determining whether to mirror the media element. In some examples, mirroring module 360 may prevent such a received media element from being mirrored, until the display status for the media element is resolved (e.g., until comparison with the at least one parameter is completed and mirroring is either confirmed or denied).

In the example of FIG. 3, display processing module 347, audio processing module 350, and mirroring module 360 are depicted as separate functional hardware and/or software components for purposes of describing the techniques of this disclosure. In other examples, functionality described herein with respect to display processing module 347, audio processing module 350, and/or mirroring module 360 may be performed by a unitary hardware and/or software component.

In other examples, any one of display processing module 347, audio processing module 350, and/or mirroring module 360 may comprise multiple hardware and/or software components that, in combination, operate according to the functionality attributed to display processing module 347, audio processing module 350, and/or mirroring module 360 as described herein. In addition, even if one or more display processing module 347, audio processing module 350, and/or mirroring module 360 described herein are implemented in software, such software modules as described herein may comprise hardware in that they functionally operate by executing on a hardware processing component.

According to one or more aspects of this disclosure, when source device 310 is operated in a mirroring mode, mirroring module 360 may selectively prevent or allow one or more received media elements of from being mirrored via a destination device (e.g., destination device 114 depicted in FIG. 1). For example, as shown in FIG. 3, display processing module 347, audio processing module 350, and/or mirroring module 360 may receive a first media element 336. Display processing module 347 and/or audio processing module 350 may cause native media of the source device mirrored via a destination device (e.g., destination device 114 depicted in FIG. 1), to include the first media element 336.

As shown in FIG. 3, display processing module 347, audio processing module 350, and/or mirroring module 360 may also receive a second media element 338. Mirroring module 360 may compare at least one characteristic of the second media element to at least one parameter. Based on the comparison, mirroring module 360 may determine whether or not to mirror the second media element 338 via at least one destination device.

In some examples, mirroring module 360 may determine whether to mirror second media element 336 based on at least one predetermined parameter stored in memory. For example, mirroring module 360 may, via display processing module 347, graphics processing module 343, and/or one or more software applications executing on processor 344, provide a user-interface that a user may use to pre-select one or more options regarding the mirroring of media via one or more destination devices as described herein. For example, mirroring module 360 may provide a user interface that allows a user to select application-specific options regarding the mirroring of media, which may be stored in memory as one or more predetermined parameters for later use in determining a mirroring status of a received media element. Based on such one or more predetermined parameters stored in memory, mirroring module 360 may confirm whether or not to mirror received second media element 338, which may thereby resolve a display status of second media element 338.

According to other examples, mirroring module 360 may determine whether or not to output the second multimedia element 338 based on one or more dynamically determined parameters. For example, in response to receiving the second media element 338, mirroring module 360 may, via display processing module 347, graphics processing module 343, and/or one or more software applications executing on processor 344, provide a user-interface that allows a user to select whether or not to mirror the second media element 338. In some examples, such a user interface may provide a user with an option to simply allow or deny mirroring of the received second media element 338. In other examples, such a user interface may, also or instead, enable a user to select one or more predetermined parameters that may be applied to further media elements received by mirroring module (and/or display processing module, audio processing module 350).

In some examples, mirroring module 360 may cause second media element 338 to not be mirrored via a destination device 314, unless mirroring module determines that the second media element 338 is to be output via the destination device 314 based on the at least one predetermined or dynamically determined parameter as described above (i.e., resolve a mirroring status of second media element 338). For example, where the parameter is a predetermined parameter, mirroring module 360 may cause the second media element 338 to not be output via the destination device unless comparison of at least one characteristic of the second media element 338 to the at least one predetermined parameter confirms that indicates the second media element 338 should be mirrored. As another example, where the parameter is a dynamically determined parameter, mirroring module 360 may not cause the second media element 337 to be output via the destination device until mirroring module 360 provides a user of source device 320 with a user interface that enables the user to confirm whether to mirror the second media element 338, and source device 310 receives such confirmation from the user that the second media element should be mirrored.

In some examples, while mirroring module 360 resolves a mirroring status of the second media element 338, mirroring module 360 may modify the mirroring of media by the destination device such that the second media element 338 is not output by the destination device. For example, mirroring module 360 may cause display processing module 347 and/or audio processing module 350 to stop mirroring any media to the destination device (e.g., via external display interface 348, external audio interface 354). According to other examples, mirroring module 360 may cause all mirrored media to be frozen until mirroring module 360 resolves a mirroring status of the second media element 338.

According to other examples, mirroring module 360 may cause the destination device to continue to mirror other native media of source device 310, such as graphical media including first media element 336 as shown in FIG. 3, without mirroring second media element 338 until the mirroring status of second media element 338 is resolved. For example, mirroring module 360 may identify at least one region in the mirrored media that corresponds to the second media element 338. According to these examples, mirroring module may cause such an identified region in the mirrored media to be removed, or frozen, which may prevent the second media element 338 from being mirrored.

In some examples, mirroring module 360 may also cause the destination device to continue to mirror native audio media of source device 310 including native audio media associated with first media element 336, until the mirroring status of second media element 338 is resolved, without mirroring any native audio media associated with second media element 338 with the mirrored media. For example, audio processing module 350 may not process any audio media associated with second media element 338 and/or send any audio media associated with second media element 338 to the destination device until the mirroring status of the second media element 338 is resolved.

In some examples, mirroring module 360 may cause at least one region of mirrored graphical media associated with second media element 338 to be visually frozen in media mirrored via the destination device. For example, mirroring module 360 may send one or more in-band or out-of-band signals that indicate, to the destination device, that the destination device should modify its operation to process received image data in order to freeze one or more regions of mirrored graphical media that correspond to second media element 338.

According to other examples, mirroring module 360 may cause source device 310 itself to process image data before the image data is sent to the destination device, such that the identified region in the mirrored media is visually frozen. According to one such example, where display processing module 347 includes a video encoding module, and the destination device includes a corresponding video decoding module, mirroring module 360 may assign one or more prediction modes to image data associated with the identified region that cause the image data, once decoded by the decoder, to be frozen by causing the video decoding module to use image data from at least one previously displayed frame of image data to present the at least one image. As one specific example, mirroring module 360 may cause a video encoding module of display processing module 347 to assign a skip prediction modes to each block of video data within the identified region, such that each of the blocks uses image data of at least one previously decoded frame unchanged to output images in identified region, as described in further detail below with reference to FIGS. 8-12.

Figure 4:
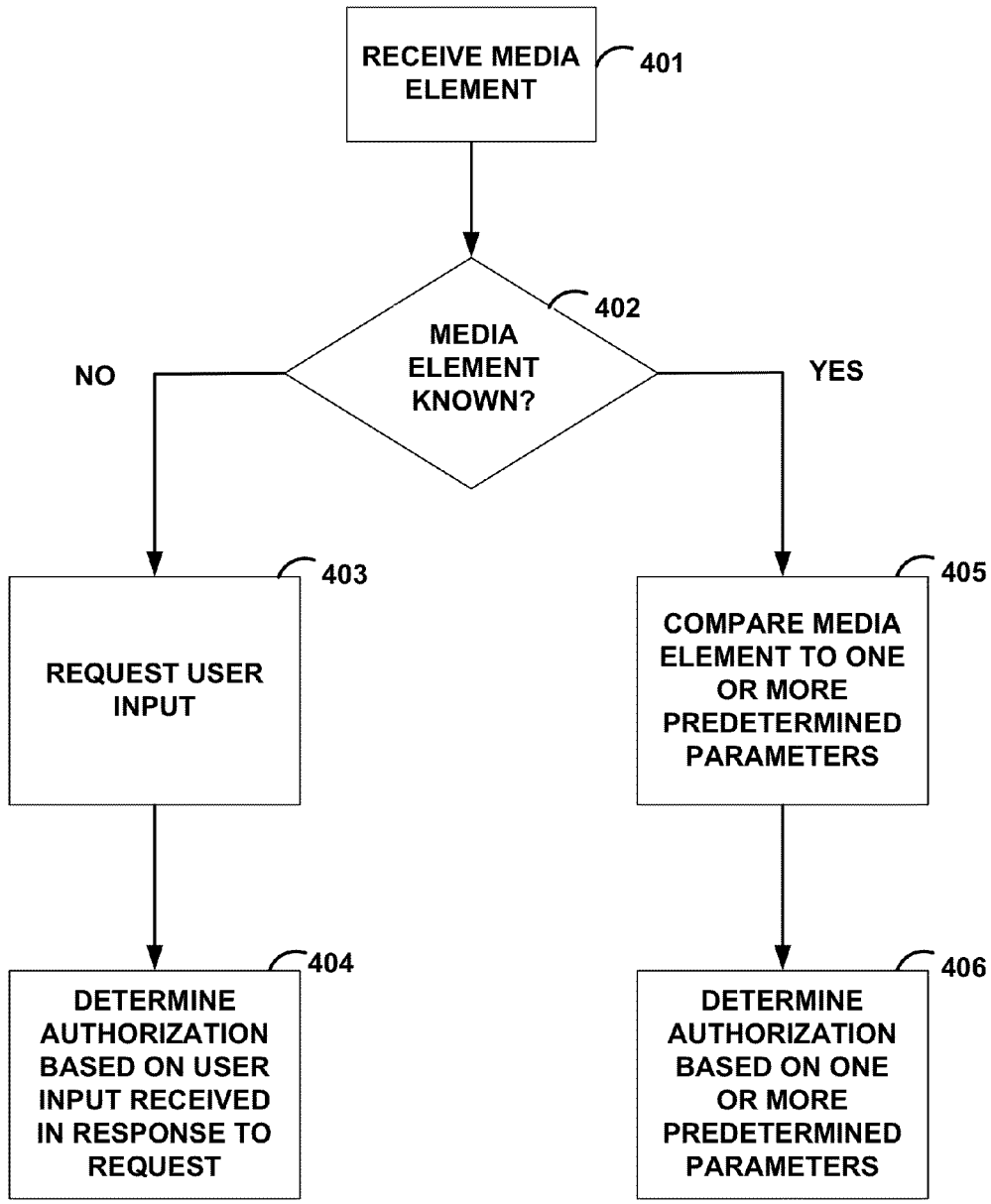
FIG. 4 is a flow diagram that illustrates one example of a method of controlling a destination device to mirror at least one media element of native media output consistent with one or more aspects of this disclosure.

FIG. 4 is a flow chart that illustrates one example of a method that may be performed by mirroring module 360 of a source device 320 consistent with one or more aspects of this disclosure. The method depicted in FIG. 4 is described as performed by mirroring module 360 of source device 320, however the method of FIG. 4 may be performed by any component of source device 320, and/or any other device.

As shown in FIG. 4, when source device 320 is operated in a mirroring mode such that native media output of source device 320 is mirrored via a destination device, mirroring module 380 may receive a media element of the native media output (401). The media element may comprise, for example, audio and/or visual data received from a software application executing on a processor of source device 320, and/or any other source.

As also depicted in FIG. 4, mirroring module 360 may determine whether or not the received media element is known to mirroring module 360 (402). For example, mirroring module 360 may determine whether there are any predetermined parameters stored in memory that may be used by mirroring module 360 to confirm whether or not the received media element should be mirrored via the destination device 114.

As also shown in FIG. 4, if mirroring module 360 determines that there are predetermined parameters stored in memory that confirm the received media element should be mirrored via the destination device, mirroring module 360 may compare at least one characteristic of the received media element to the one or more predetermined parameters (405). Based on the comparison, mirroring module 360 may determine whether or not to cause the received media element to be mirrored via the destination device (406).

As also shown in FIG. 4, if mirroring module 360 determines that the received media element is not know (e.g., there are not any predetermined parameters stored in memory that may be used to confirm whether the received media element should be mirrored), mirroring module 360 may request, from a user, confirmation of whether or not to mirror the received media element (403). For example, in response to receiving the second media element 338, mirroring module 360 may, via display processing module 347, graphics processing module 343, and/or one or more software applications executing on processor 344, provide a user-interface that allows a user to specifically indicate whether or not to mirror the received media element. As also shown in FIG. 4, mirroring module 360 may determine authorization to mirror the received media element based on user input received in response to the requested confirmation (404).

Figure 5:
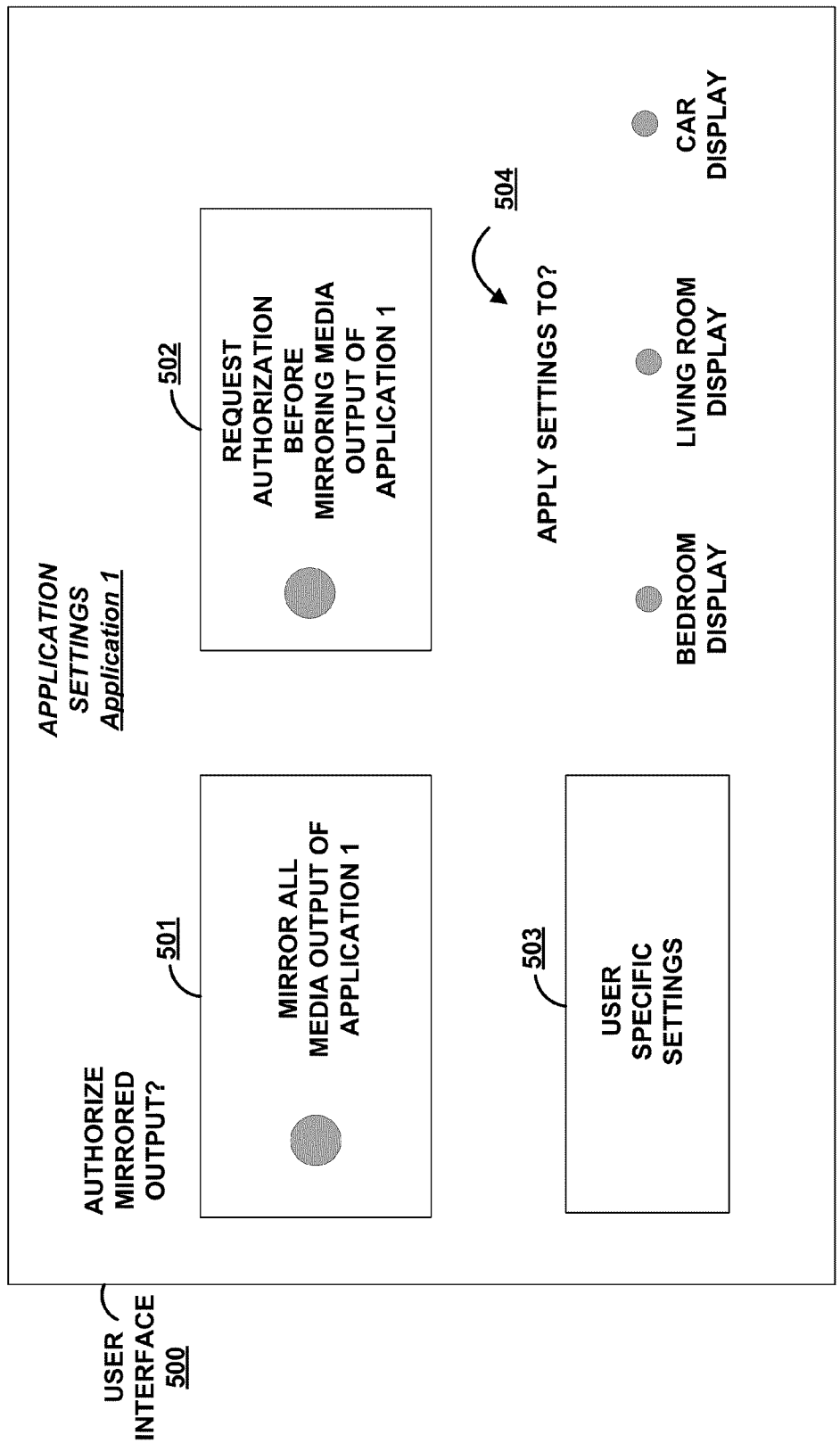
FIG. 5 is conceptual diagram that illustrates one example of a user interface that may be provided to a user consistent with one or more aspects of this disclosure.

As described above, in some examples, mirroring module 360 may determine a mirroring status for a received media element based on one or more predetermined parameters stored in memory. As also described above, mirroring module 360 may be operable to provide a use with a user-interface that enables the user to specify such predetermined parameters. FIG. 5 is a conceptual diagram that illustrates one example of such a user interface 501 that enables a user to identify one or more such predetermined parameters consistent with one or more aspects of this disclosure.

According to the example of FIG. 5, a user interface 501 is depicted that may enable a user to specify one or more mirroring parameters associated with an application, "Application 1" executable by a processor of source device 320. As shown in the example of FIG. 5, user interface 500 enables a user to select one or more application specific parameters. For example, button 501 depicted in FIG. 5 may enable a user to authorize all media output from Application 1 to be mirrored via one or more destination devices. As another example, as also depicted in FIG. 5, button 502 may enable a user to instead indicate mirroring module 360 should request authorization from the user (and/or other users) before mirroring any particular media element received from Application 1.

As also shown in FIG. 5, user interface 500 may, in some examples, also enable a user to identify one or more user-specific settings associated with Application 1. For example, button 504 depicted in FIG. 5 may bring the user to another user interface (not depicted) that may enable a user to select one or more mirroring options specific to one or more other users of Application 1. For example, where Application 1 comprises a messaging application, such as a text messaging, telephony, social networking, or other messaging application, button 504 depicted in FIG. 5 may enable a user of source device 310 to identify one or more other users or groups of user, and indicate whether or not media elements from Application 1 should all be mirrored, all be prevented from being mirrored, or should only be mirrored if user confirmation is requested and received.

As also depicted in FIG. 5, where source device 310 is configured to mirror native media output of source device 310 via more than one destination device, user interface 500 may enable user to apply one or more settings indicated by the user via user interface 500 to one or more particular destination devices. For example, as shown in FIG. 5, buttons 504 may enable a user to select one or more of a destination device coupled to a display and/or an associated audio output device located in the user's bedroom, a display and/or an associated audio output device located in the user's living room, and/or a display and/or an associated audio output device located in the user's car.

As described above, in some examples, mirroring module 360 may determine a mirroring status for a received media element based on one or more dynamically determined parameters. For example, in response to receiving a media element, mirroring module 360 may provide a user interface that enables a user to confirm, or deny, mirroring of the received information element via one or more destination devices. In one example, such a user interface may present one or more user-selectable buttons that enable the user to confirm or deny mirroring of the specific media element. In addition, if the source device 310 is configured to mirror media to more than one destination device, and the user confirms mirroring of the media element, such a user interface may also enable the user to identify one or more destination devices via which to mirror the media element.

Figure 6:
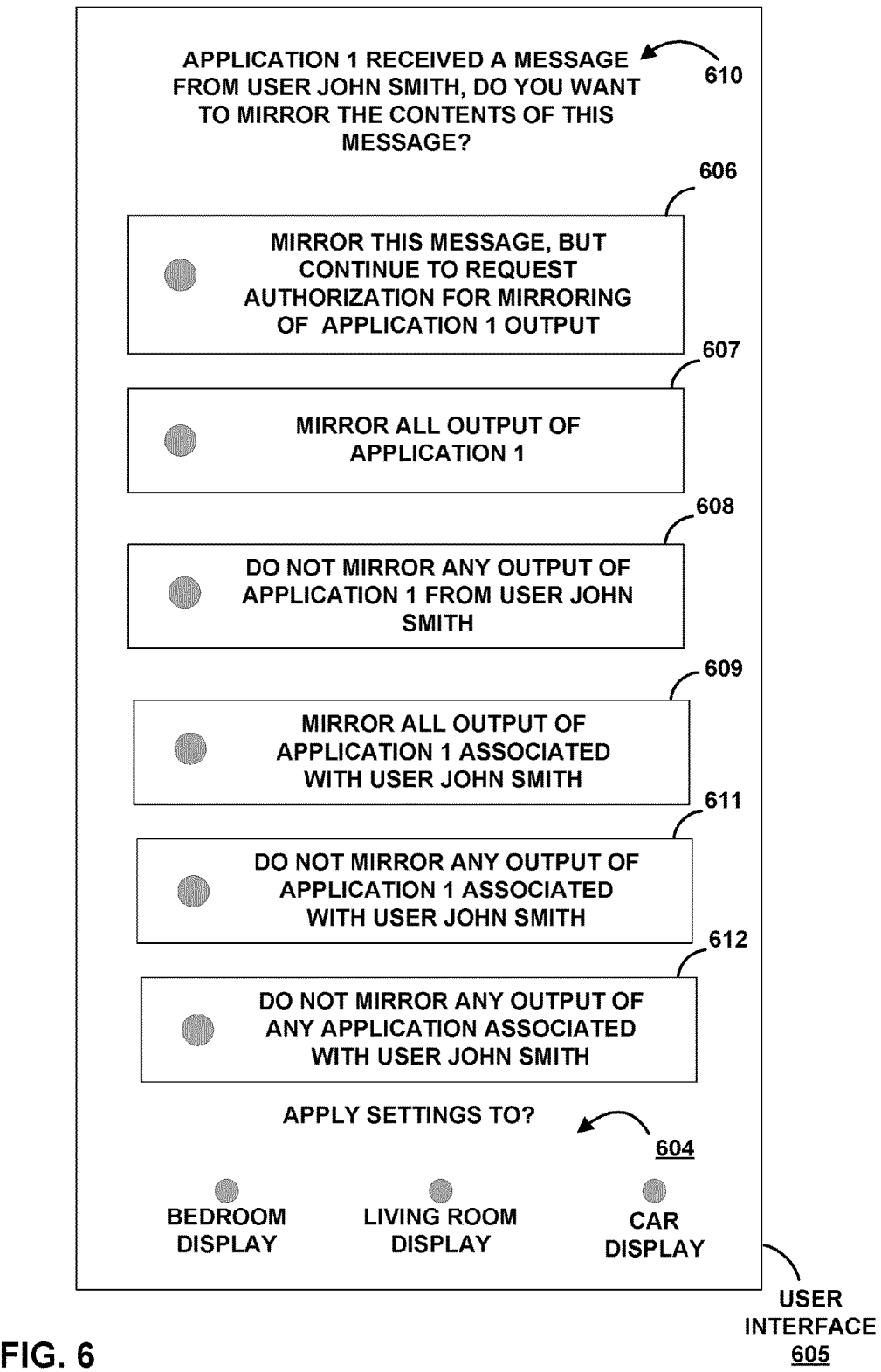
FIG. 6 is a conceptual diagram that illustrates another example of a user interface that may be provided to a user consistent with one or more aspects of this disclosure.

In other examples, such a user interface provided in response to such a received media element may also enable a user to select one or more parameters that may later be used by mirroring module 360 to determine a mirroring status of one or more other media elements received by the mirroring module. FIG. 6 is a conceptual diagram that depicts one example of such a user interface that may be presented in response to a received media element. As depicted in FIG. 6, user interface 600 includes an identification 610 of the received media element. For example, as shown in FIG. 6, identification 610 indicates that the media element comprises a notification of a message from user John Smith via an application "Application 1."

As also depicted in the example of FIG. 6, user interface 600 enables a user to select one or more user and/or application-specific options regarding the mirroring of the received media element. For example, button 606 may enable a user to indicate that the particular message identified by identification 610 should be mirrored, however mirroring module should continue to request authorization for mirroring further media elements received from Application 1. As another example, button 607 may enable a user to indicate that all media output received via Application 1 should be mirrored via one or more destination devices. As another example, button 608 may enable a user to indicate that no media output received from Application 1 should be mirrored. As another example, button 609 may enable a user to indicate that all media output received via Application 1 from user John Smith should be mirrored. As another example, button 611 may enable a user to indicate that no output of Application 1 from user John Smith should be mirrored. As another example, button 612 may enable a user to indicate that no media output from any application associated with user John Smith should be mirrored.

As also depicted in FIG. 6, where source device 310 is configured to mirror media output via more than one destination device, user interface 600 may enable user to apply one or more settings indicated by the user via user interface 600 to one or more particular destination devices. For example, as shown in FIG. 6, buttons 604 may enable a user to select one or more of a destination device coupled to a display and/or an associated audio output device located in the user's bedroom, a display and/or an associated audio output device located in the user's living room, and/or a display and/or an associated audio output device located in the user's car.

Figure 7:
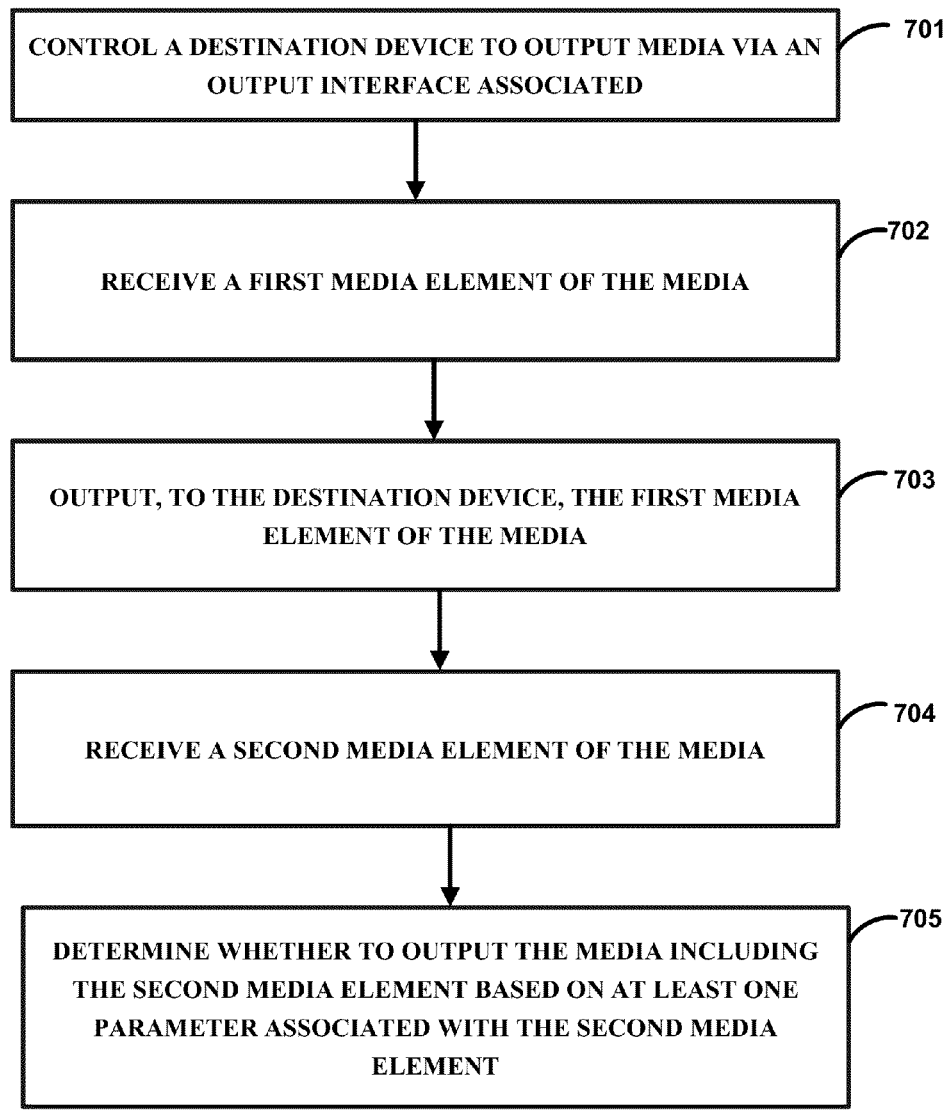
FIG. 7 is a flow diagram that depicts one example of a method of controlling a destination device to mirror native media output consistent with one or more aspects of this disclosure.

FIG. 7 is a flow diagram that illustrates one example of a method of operating a source device to mirror media output of the source device via at least one destination device consistent with one or more aspects of this disclosure. The method depicted in FIG. 7 is described as being performed by source device 310 depicted in FIG. 3, however the method of FIG. 7 may be performed by any device.

As depicted in FIG. 7, source device 310 may control a destination device (e.g., destination device 114 depicted in FIG. 1) to output media via an output interface (e.g., external display interface 120, external audio interface associated with the destination device (701). For example, source device 310 may control the destination device to mirror media that is native to the source device. As also depicted in FIG. 7, source device 310 may receive a first media element (e.g., first media element 236 depicted in FIG. 2, first media element 336 depicted in FIG. 3) of the media (602). For example, source device 310 may receive the first media element of the media from at least one software application executing on source device 310.

As also depicted in FIG. 7, source device 310 may output, to the destination device, the media comprising the first media element (703). As also depicted in FIG. 7, source device 310 may receive a second media element (e.g., second media element 238 depicted in FIG. 2, second media element 338 depicted in FIG. 3) of the media (704). As also shown in FIG. 7, source device 310 may determine whether to output the media including the second media element based on at least one parameter associated with the second media element (705). For example, source device 310 may compare at least one characteristic of the second media element to the at least one parameter, and determine whether to output the media including the second media element to the destination device. In some examples, the at least one parameter may comprise a previously determined parameter stored in memory, which may be based on previously received user interface input. In other example, the at least one parameter may be dynamically determined by source device 310. For example, in response to receiving the second media element, source device 310 may provide a user interface to the user that enables the user to specify whether or not to mirror the media comprising the second media element to the destination device.

In some examples, source device 310 may not output the media comprising the second media element unless the source device resolves a mirroring status of the second media element. For example, source device 310 may not output the media comprising the second media element unless source device 310 receives confirmation from the user to mirror the media comprising the second media via the user interface. In some examples, while source device 310 resolves a mirroring status of the second media element, source device 310 may or may not control the destination device to output other media, such as media including the first media element.

Figure 8:
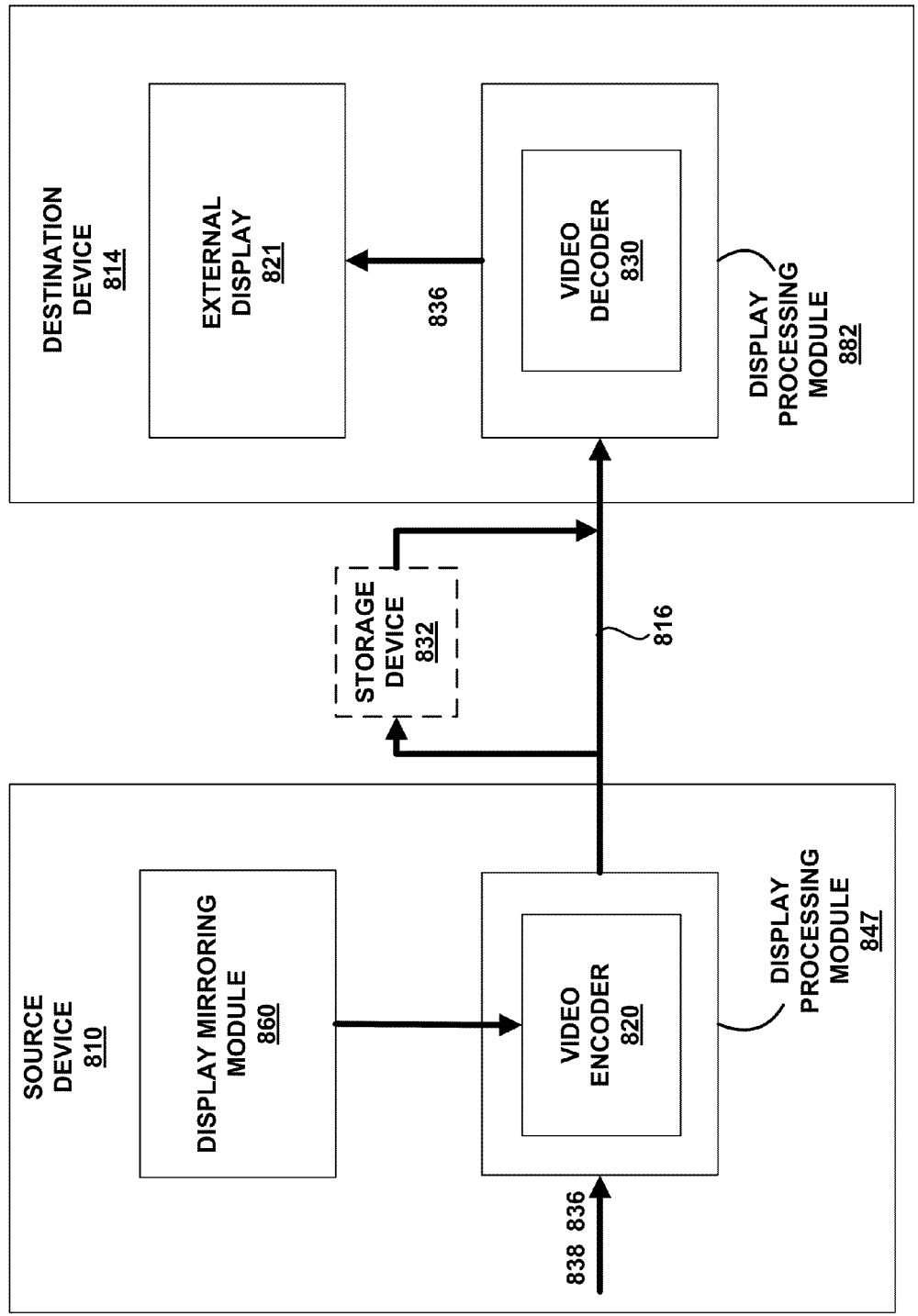
FIG. 8 is a block diagram that illustrates one example a source device that includes a video encoder and a destination device that includes a video decoder consistent with one or more aspects of this disclosure.

FIG. 8 is a block diagram that depicts one example of a source device 810 configured to mirror media output of the source device 810 via at least one destination device 814 consistent with one or more aspects of this disclosure. As depicted in FIG. 8, source device 810 includes a display processing module 847. Display processing module 847 may receive media data comprising video data, and process the received media data to be output by one or more displays, such as a native display of source device 810 (not depicted in the example of FIG. 8) and/or an external display interface 821 of destination device 814 or communicatively coupled to destination device 814. As also shown in FIG. 8, destination device 814 may further include a display processing module 882. Display processing module 882 may be operable to receive one or more representations of media data, such as video data from source device 810, and operate external display interface 821 to present images consistent with the received media data.

According to the example of FIG. 8, display processing module 847 may include a video encoder 820. Generally speaking, video encoder 820 may be configured to encode media data to compress, or reduce a size of, the media data before the media data is transferred to another device for playback. For example, video encoder 820 may compress media data comprising video data before source device 810 sends the media data to destination device 814. As one example, video encoder 820 may compress received media to generate an encoded bit stream. Such an encoded bit stream may, in some examples, be sent to another device, such as destination device 814.

As shown in FIG. 8, display processing module 882 of destination device 814 may also include a corresponding video decoder 830. Generally speaking, video decoder 830 may receive compressed data, such as an encoded bit stream from source device 810 via a communications link 816 and/or storage media 832 depicted in FIG. 8, and decompress, or decode, the compressed data to reconstruct the video data in a format to be output via one or more displays.

As also shown in FIG. 8, described above, according to some aspects of this disclosure, source device 810 control destination device 814 to mirror media output of source device 810 via destination device 814. For example, source device 810 may receive a first media element 836, and cause destination device 814 to output video media comprising first media element 836 via external display 821.

Source device 810 may also receive a second media element 838. As described above with respect to source device 310 depicted in FIG. 3, source device 810 may prevent second media element 838 from being mirrored via destination device 814, until a mirroring status of second media element 838 is resolved. For example, source device 810 may prevent the second media element 838 from being output unless source device 810 confirms that second media element 838 should be mirrored, based on at least one predetermined or dynamically determined parameter, as described above.

As also described above, in some examples, source device 810 may prevent second media element 838 from being mirrored by causing destination device 814 to cease outputting all media. For example, source device 810 may stop sending further media to destination device 814, until source device 810 resolves a mirroring status of second media element 838.

In other examples, source device 810 may prevent second media element 838 from being mirrored causing destination device 814 to freeze a frame of media currently output by destination device 814 that does not include the second media element 838. For example, source device 810 may communicate one or more in-band or out-of-band commands to destination device 814 to cause destination device 814 to continue reading a previously displayed frame of image data from memory, until source device 810 resolves a display status of second media element 838. As another example, source device 810 may repeatedly send data representing a previously displayed frame of video media to destination device 814.

According to still other examples, source device 810 may continue to actively mirror media via destination device 814, while preventing second media element 838 from being mirrored via destination device 814. For example, as described above with respect to FIG. 2, source device 810 may identify at least one region (e.g., region 233 depicted in FIG. 2) in media to be presented via destination device 814 that corresponds to second media element 838 in native media output of source device 810.

As also described above, source device 810 may operate to freeze and/or remove media output (e.g., video output) of such an identified region associated with the second media element 838, in order to prevent second media element 838 from being included in media mirrored by destination device 814, while still outputting the other mirrored media.

According to some such examples, source device 810 may communicate one or more in-band or out-of-band command signals, as described above, to destination device 814 that instruct destination device 814 to freeze and/or remove media output of such an identified region that corresponds to second media element 838. According to these examples, destination device 814 may be configured to interpret such a command signal and operate in response to such a received command signal. For example, in response to such a command signal, destination device 814 may remove media output that corresponds to such an identified region by not processing and/or outputting received media data that corresponds to the identified region. According to another example, in response to such a command signal, destination device may be configured to freeze media output that corresponds to the identified region by repeatedly reading media data of a previously displayed frame from memory, until a mirroring status of second media element 838 is resolved by source device 810. According to this example, destination device 814 may continue to receive and/or process data normally to display mirrored media outside of the identified region.

According to other examples, source device 810 may not communicate one or more such command signals that cause operation of destination device 814 to change in order to prevent second media element 838 from being mirrored along with other media. According to these examples, source device 810 may itself process image data to be sent to destination device 814, such that the second media element 838 is not included in other media mirrored via destination device 814. For example, in order to prevent second media element 838 from being output with other mirrored media, mirroring module 860 of source device 810 may modify operation of display processing module 847.

As one example, mirroring module 860 may modify operation of video encoder 820 of display processing module 847 to prevent second media element 838 from being output with other mirrored media via destination device 814. For example, mirroring module 860 may cause video encoder 820 to encode data representing media of at least one identified region that corresponds to second media element 838 differently than data that represents media outside of the identified region.

As one example, mirroring module 860 may cause video encoder 820 to encode, as part of an encoded bit stream that represents media to be mirrored via destination device 814, one or more syntax elements that instruct the decoder to decode the bit stream. For example, according to the techniques described herein, video encoder 920 may signal such syntax elements that indicate that the decoder should use data of at least one previous frame of image data without any modifications to display images in the at least one identified region. In this manner, mirroring module 860 may cause native media of source device 810 to continue to be actively mirrored via destination device 814, while preventing second media element 838 from being output in the mirrored media, by changing how video encoder 830 operates to encode the at least one identified region associated with the second media element 838.

According to some examples, video encoder 820 and video decoder 830 may operate according to a video compression standard, such as the High Efficiency Video Coding (HEVC) standard presently under development, and may conform to the HEVC Test Model (HM). Alternatively, video encoder 820 and video decoder 830 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

During the encoding process, video encoder 820 may execute a number of coding techniques or operations. In general, video encoder 820 operates on video blocks within individual video frames (or other independently coded units such as slices) in order to encode the video blocks. Frames, slices, portions of frames, groups of pictures (i.e., frames), or other data structures may be defined as independent data units that include a plurality of video blocks, and syntax elements may be included that are associated with such different independent data units. The video blocks within independent data units may have fixed or varying sizes, and may differ in size according to a specified coding standard. In some cases, each video frame may include a series of independently decodable slices, and each slice may include one or more macroblocks or LCUs.

Macroblocks are one type of video block defined by the ITU H.264 standard and other standards. Macroblocks typically refer to 16 by 16 blocks of data. The ITU-T H.264 standard supports intra prediction in various block sizes, such as 16 by 16, 8 by 8, or 4 by 4 for luma components, and 8 by 8 for chroma components, as well as inter prediction in various block sizes, such as 16 by 16, 16 by 8, 8 by 16, 8 by 8, 8 by 4, 4 by 8 and 4 by 4 for luma components and corresponding scaled sizes for chroma components.

The emerging HEVC standard defines new terms for video blocks. In particular, with HEVC, video blocks (or partitions thereof) may be referred to as "coded units." With the HEVC standard, largest coded units (LCUs) may be divided into smaller and smaller coded units (CUs) according to a quadtree partitioning scheme, and the different CUs that are defined in the scheme may be further partitioned into so-called prediction units (PUs) and/or transform units (TUs). The LCUs, CUs, and PUs, and TUs are all video blocks within the meaning of this disclosure. Other types of video blocks may also be used, consistent with the HEVC standard or other video coding standards. Thus, the phrase "block" refers to any size of video block. Moreover, video blocks may sometimes refer to blocks of video data in the pixel domain, or blocks of data in a transform domain such as a discrete cosine transform (DCT) domain, a domain similar to DCT, a wavelet domain, or the like.

Referring again to FIG. 8, video encoder 820 may perform predictive coding in which a video block being coded is compared to another block of video data in order to identify a predictive block. This process of predictive coding across frames is often referred to as motion estimation and motion compensation. Motion estimation estimates video block motion relative to one or more predictive video blocks of one or more predictive frames (or other coded units). Motion compensation generates the desired predictive video block from the one or more predictive frames or other coded units. Motion compensation may include an interpolation process in which interpolation filtering is performed to generate predictive data at fractional pixel precision. This process of prediction coding can also be performed within a frame, where spatially neighboring pixels within the same frame to a current block are used to generate a predictive block.

After generating the predictive block, the differences between the current video block being coded and the predictive block are coded as a residual block, and prediction syntax (such as a motion vector) is used to identify the predictive block. For example, Video encoder 820 may code each block (i.e., each CU according to HEVC) using one of several prediction modes. For example, according HEVC, the prediction modes may include, for example, a split mode, a skip mode, a direct mode, as well as additional modes for Inter_2N×2N, Inter_N×2N, Inter_2N×N, Inter_N×N, Inter_2N×nU, Inter_2N×nD, Inter_nL×2N, Inter_nR×2N, Intra_2N×2N, and Intra_N×N, where such modes refer to the sizes of the PUs and whether the mode is an intra- or inter-predictive mode. According to a skip mode, a current CU (e.g., a current PU) is reconstructed based on a co-located block in a reference frame without residual data, resulting in the current CU being identical to the co-located block in the reference frame. In direct mode, a current CU is reconstructed based on a co-located block in a reference frame with residual data, resulting in the current PU corresponding to the reference block plus residual data. In some examples, such prediction modes may be generally exclusive to one another, meaning any given CU may be coded using only one of the modes.

This disclosure describes techniques for identifying, by a source device such as source device 810 depicted in FIG. 8, a region within video to be displayed by another, destination device 814, at least one region of the video output to freeze, and modifying operation of encoder 820 to cause the identified at least one region of the video output to be visually frozen in media output. In some examples, the at least one region of the video output to freeze may be determined by mirroring module 860 depicted in FIG. 8. According to these examples, mirroring module 860 may identify the at least one region based on a corresponding region in native video output of source device 810 associated with second media element 838, in order to prevent second media element 838 from being output along with other mirrored media (e.g., other mirrored video), such as media including first media element 836. As described above, mirroring module 860 may modify operation of video encoder 820 to prevent second media element 838 from being displayed, until a mirroring status of the second media element 838 is resolved.

To encode video data, video encoder 820 may divide a frame or slice of video data into a plurality of blocks of video data (e.g., a plurality of CU according to HEVC). As part of the encoding process, video encoder 820 may assign one or more prediction modes that signal, to a decoder that decodes the video data, how to predict content of each particular block relative to other blocks in the same or different frame or slice of video data.

Figure 9:
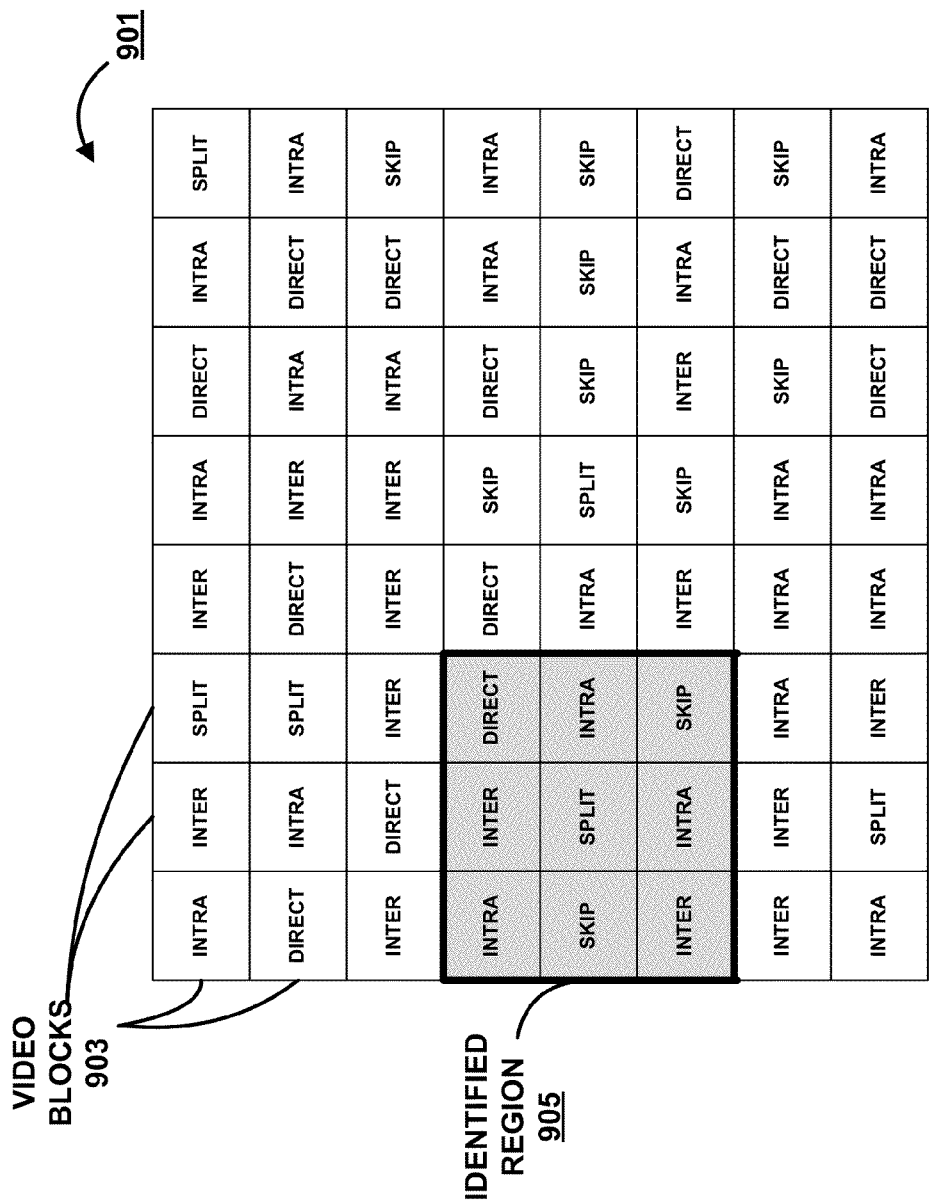
FIGS. 9 and 10 are conceptual diagrams that illustrate one example of a technique for visually freezing at least one identified region in a frame media output by a destination device consistent with one or more aspects of this disclosure.

According to some aspects of this disclosure, in response to identifying at least one region in mirrored video that should be frozen, source device 810 may cause video encoder 820 to assign a skip prediction mode to each block within the identified region. FIG. 9 is a conceptual diagram that illustrates one example of a frame 901 of video data. In some examples, frame 901 may correspond to an entire frame of video data to be displayed. According to other examples, frame 901 may comprise a subset of a frame of video data, such as a slice or larger block of video data (e.g., a macroblock or higher-level CU, such as an LCU as described above). As shown in the example of FIG. 9, video encoder 820 may encode frame 901 as a plurality of blocks 903 of video data.

As described above, under normal operation, as video encoder 820 encodes the blocks 903, video encoder 820 may assign a prediction mode to each block 903 of the frame 901. The prediction mode for each of the plurality of blocks may be signaled as one or more syntax elements associated with each respective block to a decoder as part of an encoded bit stream of video data represents frame 901. For example, as shown in FIG. 9, as a result of encoding, each block 903 of frame 901 has been assigned one of a split mode, a skip mode, a direct mode, or an intra mode or inter mode. Frame 901 depicted in FIG. 9 is provided for exemplary purposes only. In other examples, video encoder 820 may assign one or more other prediction modes not shown in the example of FIG. 9 to one or more blocks 903 of frame 901. For example, according to the H.264 video coding standard, video encoder 820 may assign one of nine different prediction modes to each block 903 of frame 901. As another example, according to the proposed HEVC standard for video coding, video encoder 820 may assign one of 33 prediction modes to each block 903 of frame 901.

As also depicted in FIG. 9, source device 810 may identify a region to freeze 905 in frame 901. For example, as described above, mirroring module 860 of source device 810 may identify region 905 as one that corresponds to second media element 838 depicted in FIG. 8, in order to prevent second media element 838 from being mirrored via destination device 814.

As depicted in FIG. 9, under normal operation, video encoder 820 may assign one of a plurality of prediction modes all the blocks 903 of video data of frame 901. For example, under normal operation, video encoder 820 may assign a block of video data in a portion of a frame that does not change a skip prediction mode, so that a decoder that decodes the block does not apply any residual block to the encoded block to reconstruct the frame. Instead, the decoder may use the prediction block alone to reconstruct the block. As another example, under normal operation, video encoder 820 may assign one or more blocks where images change a prediction mode of a plurality of other prediction modes that instruct the decoder to apply a residual block to a prediction block to reconstruct the encoded frame.

Figure 10:
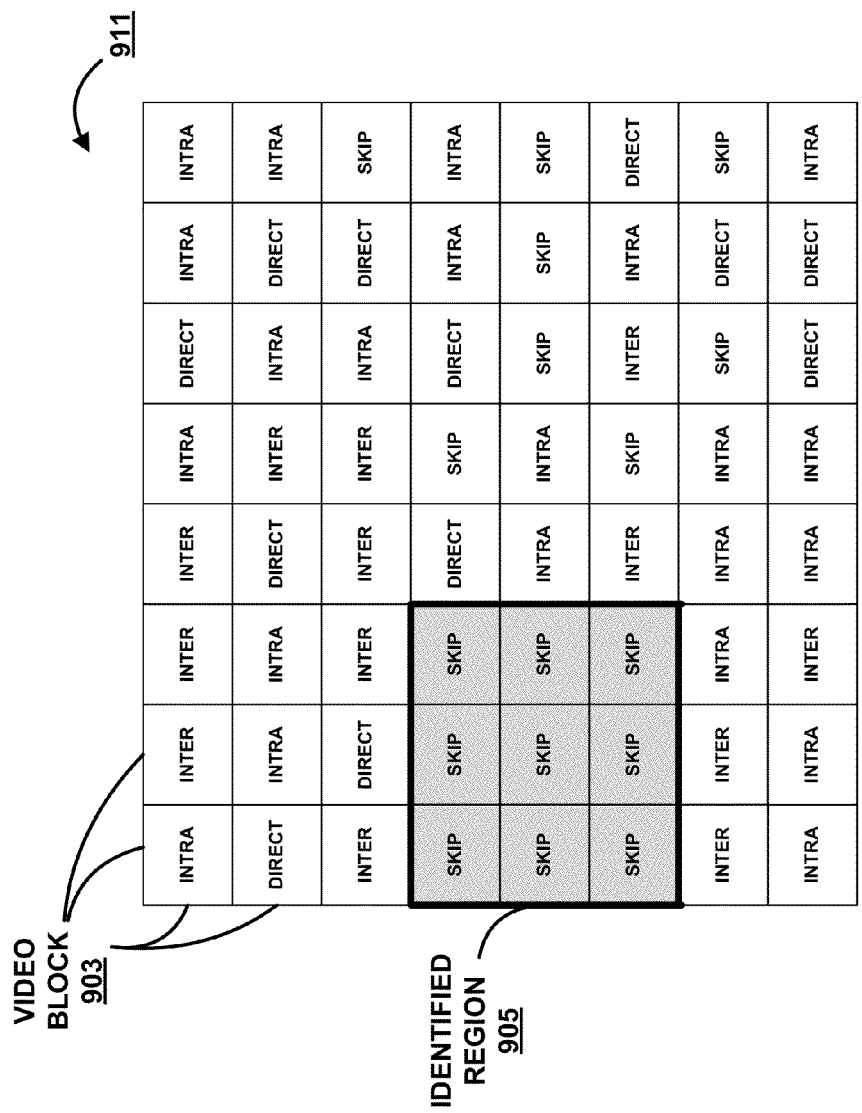

According to some aspects of this disclosure, instead of video encoder 820 assigning different prediction modes such as split, skip, direct, or one of a plurality of intra and/or inter prediction modes to blocks of identified region, video encoder may instead assign the same prediction mode to all the blocks of identified region 905, regardless of differences between the frame and a previous frame, as shown in the example of FIG. 10. For example, as shown in FIG. 10, video encoder 820 may assign each block of video data within identified region 905 of frame 911 with a skip prediction mode. In this manner, video encoder 820 may encode the blocks within region differently than in a standard prediction mode, where at least some of the blocks within region would have been assigned to have one or more other prediction modes that cause the decoder to apply a residual block of data to a predictive block in order to reconstruct the block.

In some examples, in response to identifying a region 905 to freeze in frame 901, video encoder 820 may generate an encoded bit stream that represents frame 911 shown in FIG. 10, which includes one or more syntax elements that signal the skip prediction modes assigned to each block of identified region 905. Video encoder 820 may send the encoded bit stream to a video decoder, such as video decoder 830 of destination device 814 depicted in FIG. 8. The video decoder 830 may receive the encoded bit stream from encoder 820, via a direct communications link 816, or via a storage medium, such as storage device 832 depicted in FIG. 8. Video decoder 830 may decode the received encoded bit stream, to reconstruct frame 911 in order to output frame 911 via external display 821.

To decode the received encoded bit stream, video decoder 830 may operate normally, and apply the signaled skip prediction modes that video encoder 820 assigned to each block within identified region 905, which may cause video decoder 830 to not apply any change, such as a residual block, to reconstruct frame 911 of video data. In this manner, encoder 820 of source device 810 may use unchanged data of at least one previously presented frame to output (display) media associated with the at least one region 905, which may cause the at least one region to appear visually frozen to a viewer. In some examples, source device 810 (e.g., mirroring module 860) may cause encoder 820 to freeze such a portion of video output that corresponds to identified region 905 as described above, in order to prevent a second media element 838 as depicted in FIG. 8 associated with identified region 905 from being mirrored via destination device 814.

Figure 11:
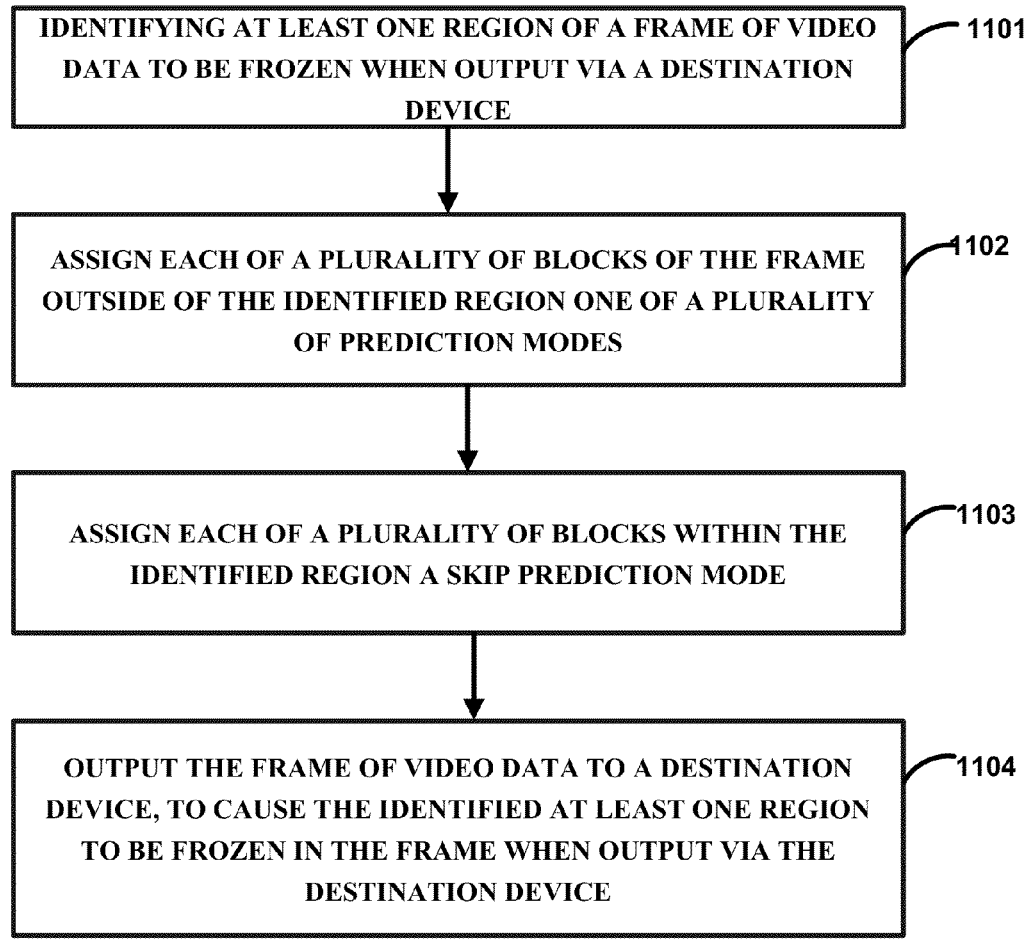
FIG. 11 is a flow diagram that illustrates one example of a method of visually freezing at least one identified region in a frame media output by a destination device consistent with one or more aspects of this disclosure.

FIG. 11 is a flow diagram that illustrates one example of a method of encoding video data consistent with one or more aspects of this disclosure. The example of FIG. 11 is described as performed by source device 810 depicted in the example of FIG. 8, however any device may be used to perform the method of FIG. 11.

As shown in FIG. 11, source device 810 may identify at least one region (903) of a frame of video data to be frozen when output via a destination device (1101). As also shown in FIG. 11, source device 810 (e.g., video encoder 820) may assign each of a plurality of blocks of the frame that are outside of the identified region one of a plurality of prediction modes (1102). For example, source device 810 may assign each of the plurality of blocks one of a split mode, a skip mode, a direct mode, or an intra mode or inter mode, or other prediction mode. In some examples, source device 810 may assign at least some of the plurality of blocks outside of the identified region a prediction mode based on one or more differences between each of the blocks and at least one predictive block that may be used to reconstruct the block. For example, if there are differences between a block outside of the identified region, source device 810 may assign the block one of a direct, intra, or inter prediction mode, which may be used by a decoder to determine a residual block that may be applied to a predictive block to reconstruct the block. In other examples, if there are no differences between a block outside of the identified region and a predictive block that may be used to reconstruct the block, source device 810 may assign the block a skip prediction mode.

As also shown in FIG. 11, source device 810 may assign all of a plurality of blocks of the frame that are within the identified region the same prediction mode. For example, source device 810 may assign each of the plurality of blocks within the identified region a skip prediction mode (1103). In some examples, source device 810 may assign each of the plurality of blocks within the identified region the skip prediction mode, regardless of whether there are any differences between the block and a predictive block that may be used by a decoder to reconstruct the block.

As also shown in FIG. 11, source device 810 may output the frame of video data to a destination device (e.g., destination device 814 depicted in FIG. 8), to cause the identified at least one region to be visually frozen in the frame when the frame is output via the destination device (1104). For example, the destination device may include a video decoder 830, and the frame of video data may be received by the video decoder as an encoded bit stream. The video decoder may decode the received encoded bit stream, using one or more prediction modes associated with blocks of video data that are signaled in the encoded bit stream. According to this example, because blocks of video data within the identified region were all assigned skip modes as described above, when the video decoder operates normally to decode the blocks, previously output (e.g., displayed) image data may be used by video decoder for the identified at least one region. In this manner, the identified at least one region in a displayed image may appear visually frozen to a viewer.

Referring back to the example of FIG. 3, according to some aspects of this disclosure, a source device 310 may operate in a mirroring mode to mirror native media of the source device, including audio and/or video media, via a destination device 314. As described above, source device 310 may receive a media element (e.g., second media element 336 depicted in FIG. 3) of media to be mirrored via destination device 314, and determine whether or not to mirror the received media element based on at least one parameter associated with the media element. The received media element may or may not be output by a native audio or display interface of the source device 310. As also described above, source device 310 may operate to prevent the media element from being output via the destination device 314 (e.g., by freezing or removing one or more regions associated with the media element in media native to source device 310 in the mirrored media), until a mirroring status of the media element is resolved by the source device 310. To do so, source device 310 may continue mirroring other native media output of the source device, modified such that the received media element is not output via the destination device 314. In some examples, once the source device 310 resolves the mirroring status of the media element (e.g., determines whether or not to mirror the media element with other media), the source device 310 may cease modifying native media output mirrored to the source device 310, such that the received media is not output via the destination device 314. Instead, source device 310 may return to mirroring the other native media output as usual.

According to some examples, a video sequence may include a series of video frames or pictures. The frames or pictures may be arranged into a plurality of group of pictures (GOP) that generally comprises a series of one or more of the video pictures. A GOP may include syntax data in a header of the GOP, a header of one or more of the pictures, or elsewhere, that describes the pictures included in the GOP. In some examples, syntax data in a header of a GOP may identify a picture of the GOP as an access point may be used as a starting point for playback of the video sequence. In some examples, such an access point may comprise an independently decodable frame of the video sequence. The independently decodable frame may not rely on data from any other frames to be decoded by a decoder.

As described above, source device 310 may transition from operating in a normal mode to mirror native media output of source device 310 via destination device 314, and a modified mode to prevent one or more media elements of the native media from being mirrored via the destination device. According to some aspects of this disclosure, when source device 310 transitions between modes as described above, source device 310 may control destination device 814 to begin outputting mirrored media (e.g., mirrored video media) at a new GOP (e.g., at an identified access point of the new GOP). In some examples, when source device 310 transition to operating in the modified mode, source device may use a longer GOP to begin outputting media. In some examples, when source device transitions back to a normal operating mode, source device 310 may use a shorter GOP to begin outputting media.

Figure 12:
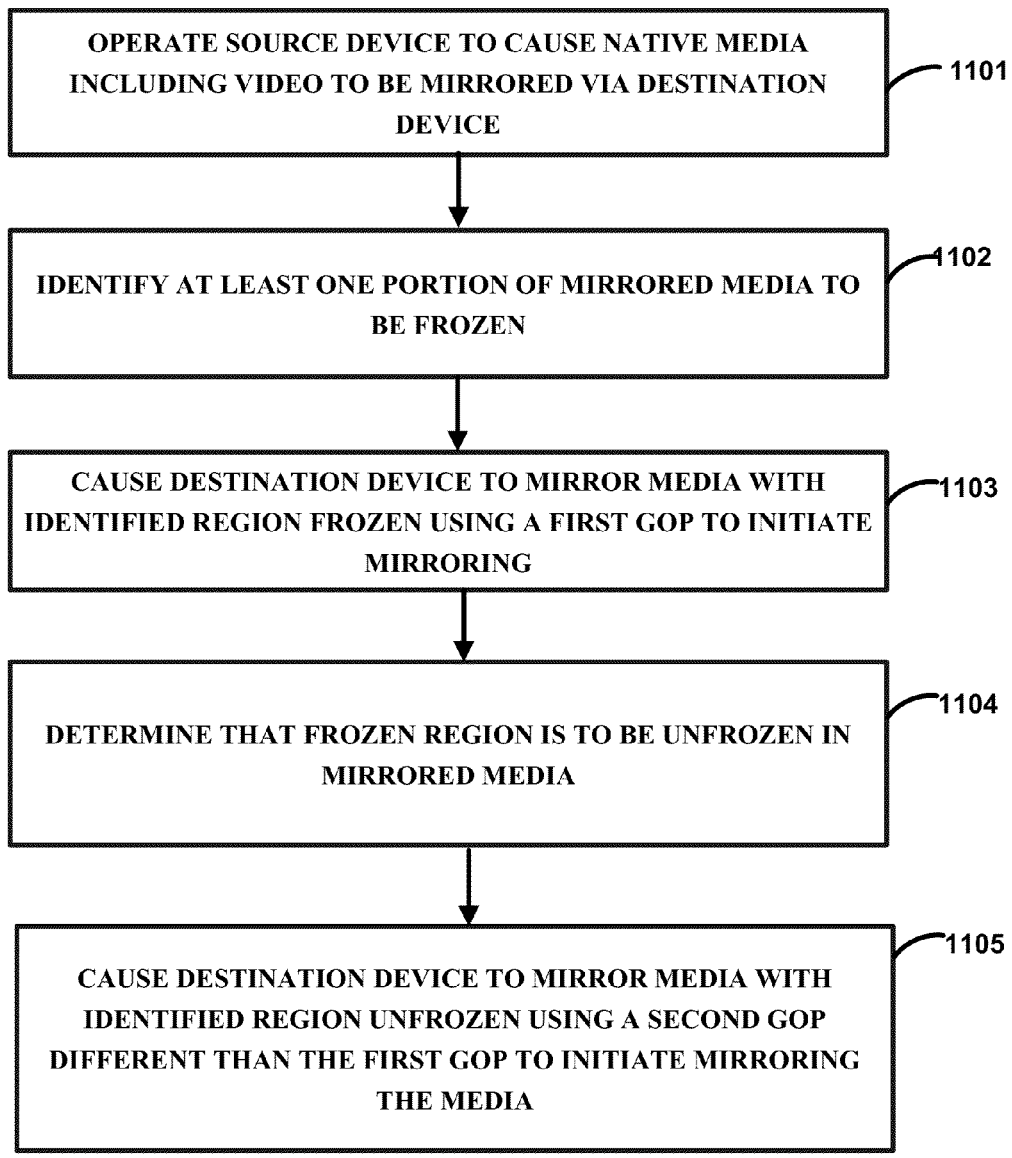
FIG. 12 is a flow diagram that illustrates one example of a method of mirroring media via a destination device consistent with one or more aspects of this disclosure.

FIG. 12 is a flow diagram that depicts one example of a technique for mirroring native media via a destination device 314 consistent with one or more aspects of this disclosure. As shown in FIG. 12, source device 310 may be operated to cause native media of source device 310, which includes video media, to be mirrored via a destination device 314 (1201). As also shown in FIG. 12, source device 310 may identify at least one portion of mirrored media to be frozen (1202). For example, source device 310 may identify the at least one portion of mirrored media to be frozen to prevent at least one received native media element of the source device 310 from being mirrored via the destination device, as described herein. As also shown in FIG. 12, in response to identifying the at least one region of mirrored media to be frozen (e.g., in response to receipt of a new media element of the media) source device 310 may cause the destination device 314 to mirror the media with the identified region frozen using a first GOP to initiate mirroring of the media (1203). For example, source device 310 may cause the destination device to mirror the media with the identified region frozen beginning at an identified access point picture of the first GOP. As also shown in FIG. 12, source device 310 may determine that the at least one frozen region is to be unfrozen in the mirrored media (1204). As also depicted in FIG. 12, source device 310 may cause the destination device to mirror media with the identified region unfrozen using a second GOP different than the first GOP (1205). For example, source device 310 may cause the destination device to mirror the media beginning at an identified access point picture of the second GOP. In some examples, source device 310 may select the first GOP to have a longer length than the second GOP.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various embodiments of the invention have been described. These and other embodiments are within the scope of the following claims.

The invention claimed is:

1. A method for mirroring native media of a source device via a destination device, the method comprising:
   receiving a first media element of the native media of the source device;
   causing the destination device to mirror the native media comprising the first media element via an output interface associated with the destination device;
   receiving a second media element of the native media of the source device;
   determining whether to cause the destination device to mirror the native media including the second media element based on at least one parameter associated with the second media element;
   in response to determining to cause the destination device to not mirror the second media element, identifying a region of the native media that corresponds to the second media element; and
   causing the destination device to display, in the identified region, image data of a previous frame of image data, wherein causing the destination device to display the image data of the previous frame of video data prevents the destination device from displaying the second media element.

2. The method of claim 1, wherein the at least one parameter is based on user input.

3. The method of claim 2, wherein the at least one parameter is based on previously received user input stored in memory.

4. The method of claim 2, wherein the at least one parameter is based on dynamically determined user input received in response to receiving the second media element.

5. The method of claim 4, further comprising:
   in response to receiving the second media element from at least one software application, providing a user with a user interface that enables the user to indicate whether to control the destination device to mirror the second media element.

6. The method of claim 1, further comprising:
   causing the destination device to not mirror the second media element until it is determined whether to mirror the second media element based on the at least one parameter.

7. The method of claim 6, further comprising:
   causing the destination device to mirror other native media including the first media element while causing the destination device to not mirror the second media element.

8. The method of claim 7, wherein causing the destination device to mirror other native media including the first media element while causing the destination device to not mirror the second media element comprises:
   causing the destination device to mirror the first media element, including reading at least some previously output media stored in memory.

9. The method of claim 7, wherein causing the destination device to mirror other native media including the first media element while causing the destination device to not mirror the second media element comprises:
   sending, to the destination device, the media that includes the first media element, and does not include the second media element.

10. The method of claim 9, wherein the media comprises video media, and
    wherein causing the destination device to mirror other native media including the first media element while causing the destination device to not mirror the second media element comprises:
       encoding the native media to generate mirrored media to be mirrored by the destination device, wherein encoding the native media comprises:
          assigning one of a plurality of prediction modes to a plurality of blocks of video data outside of the identified region; and
          assigning a skip prediction mode to each of the plurality of blocks within the identified region of the media; and
       outputting the frame of video data to a destination device to cause the identified at least one region to be visually frozen in the frame when the frame is output via the destination device.

11. The method of claim 10, wherein assigning one of a plurality of prediction modes to a plurality of blocks of video data outside of the identified region comprises assigning one or more prediction modes selected from the group consisting of:
    a split mode;
    the skip mode;
    a direct mode;
    an intra mode; and
    an inter mode.

12. The method of claim 1, wherein receiving the first media element and receiving the second media element comprises receiving the first and second media elements from one or more software applications executing on at least one computing device.

13. The method of claim 12, wherein the at least one software application comprises one or more software applications selected from the group consisting of:
    a video playback application;
    a photo viewing application;
    an audio playback application;
    a telephone application;
    a text messaging application;
    an electronic mail (email) application; and
    a game application.

14. A source device configured to mirror native media of the source device via a destination device, comprising:
    a mirroring module configured to:
       receive a first media element of the native media of the source device;
       cause a destination device to mirror the native media comprising the first media element via an output interface associated with the destination device;
       receive a second media element of the native media;
       determine whether to cause the destination device to mirror the native media including the second media element based on at least one parameter associated with the second media element;

in response to determining to cause the destination device to not mirror the second media element, identify a region of the native media that corresponds to the second media element; and cause the destination device to display, in the identified region, image data of a previous frame of image data, wherein the source device causes the destination device to display the image data of the previous frame of video data to prevent the destination device from displaying the second media element.

15. The device of claim 14, wherein the at least one parameter is based on user input.

16. The device of claim 15, wherein the at least one parameter is based on previously received user input stored in memory.

17. The device of claim 15, wherein the at least one parameter is based on dynamically determined user input received in response to receiving the second media element.

18. The device of claim 17, wherein the mirroring module is further configured to:

in response to receiving the second media element from at least one software application, provide a user with a user interface that enables the user to indicate whether to control the destination device to mirror the second media element.

19. The device of claim 14, wherein the mirroring module is further configured to:

cause the destination device to not mirror the second media element until it is determined whether to mirror the second media element based on the at least one parameter.

20. The device of claim 19, wherein the mirroring module is further configured to:

cause the destination device to mirror other native media including the first media element while causing the destination device to not mirror the second media element.

21. The device of claim 20, wherein the mirroring module is further configured to:

cause the destination device to mirror the first media element, based on reading at least some previously output media stored in memory.

22. The device of claim 19, wherein the mirroring module is further configured to:

send, to the destination device, the media that includes the first media element, and does not include the second media element.

23. The device of claim 22, wherein the media comprises video media, and wherein the mirroring module is further configured to:

encode the native media to generate mirrored media to be mirrored by the destination device, including:

assigning one of a plurality of prediction modes to a plurality of blocks of video data outside of the identified region; and assigning a skip prediction mode to each of the plurality of blocks within the identified region of the media; and outputting the frame of video data to a destination device to cause the identified at least one region to be visually frozen in the frame when the frame is output via the destination device.

24. The device of claim 23, wherein the mirroring module is further configured to:

assign one of a plurality of prediction modes to each of a plurality of blocks of video data outside of the identified region selected from the group consisting of:

a split mode;

the skip mode;

a direct mode;

an intra mode; and an inter mode.

25. The device of claim 14, wherein receiving the first media element and receiving the second media element comprises receiving the first and second media elements from one or more software applications executing on at least one computing device, and wherein the at least one software application comprises one or more software applications selected from the group consisting of:

a video playback application;

a photo viewing application;

an audio playback application;

a telephone application;

a text messaging application;

an electronic mail (email) application; and a game application.

26. A non-transitory, computer-readable storage medium that stores instructions configured to cause a computing device to:

receive a first media element of native media of a source device;

cause a destination device to mirror the native media comprising the first media element via an output interface associated with the destination device;

receive a second media element of the native media; and determine whether to cause the destination device to mirror the native media including the second media element based on at least one parameter associated with the second media element;

in response to determining to cause the destination device to not mirror the second media element, identify a region of the native media that corresponds to the second media element; and cause the destination device to display, in the identified region, image data of a previous frame of image data, wherein the computing device causing the destination device to display the image data of the previous frame of video data prevents the destination device from displaying the second media element.

27. The non-transitory, computer-readable storage medium of claim 26, wherein the at least one parameter is based on user input.

28. The non-transitory, computer-readable storage medium of claim 27, wherein the at least one parameter is based on previously received user input stored in memory.

29. The non-transitory, computer-readable storage medium of claim 27, wherein the at least one parameter is based on dynamically determined user input received in response to receiving the second media element.

30. The non-transitory, computer-readable storage medium of claim 29, wherein the instructions further cause the computing device to:

in response to receiving the second media element from at least one software application, provide a user with a user interface that enables the user to indicate whether to control the destination device to mirror the second media element.

31. The non-transitory, computer-readable storage medium of claim 26, wherein the instructions further cause the computing device to:

cause the destination device to not mirror the second media element until it is determined whether to mirror the second media element based on the at least one parameter.

32. The non-transitory, computer-readable storage medium of claim 31, wherein the instructions further cause the computing device to:
cause the destination device to mirror other native media including the first media element while causing the destination device to not mirror the second media element.

33. The non-transitory, computer-readable storage medium of claim 32, wherein the instructions further cause the computing device to:
cause the destination device to mirror the first media element, based on reading at least some previously output media stored in memory.

34. The non-transitory, computer-readable storage medium of claim 32, wherein the instructions further cause the computing device to:
send, to the destination device, the media that includes the first media element, and does not include the second media element.

35. The non-transitory, computer-readable storage medium of claim 34, wherein the instructions further cause the computing device to:
encode the native media to generate mirrored media to be mirrored by the destination device, including:
assigning one of a plurality of prediction modes to a plurality of blocks of video data outside of the identified region; and
assigning a skip prediction mode to each of the plurality of blocks within the identified region of the media; and
outputting the frame of video data to a destination device to cause the identified at least one region to be visually frozen in the frame when the frame is output via the destination device.

36. The non-transitory, computer-readable storage medium of claim 35, wherein the instructions further cause the computing device to assign the one of the plurality of prediction modes selected from the group consisting of:
a split mode;
the skip mode;
a direct mode;
an intra mode; and
an inter mode.

37. The non-transitory, computer-readable storage medium of claim 26, wherein the instructions further cause the computing device to receive the first media element and the second media element comprises from one or more software applications executing on at least computing device, and wherein the at least one software application comprises one or more software applications selected from the group consisting of:
a video playback application;
a photo viewing application;
an audio playback application;
a telephone application;
a text messaging application;
an electronic mail (email) application; and
a game application.

38. A source device configured to mirror native media of the source device via a destination device, comprising:
means for receiving a first media element of the native media of the source device;
means for causing a destination device to mirror the native media comprising the first media element via an output interface associated with the destination device;
means for receiving a second media element of the native media;
means for determining whether to cause the destination device to mirror the native media including the second media element based on at least one parameter associated with the second media element; and
means for identifying a region of the native media that corresponds to the second media element in response to determining to cause the destination device to not mirror the second media element; and
means for causing the destination device to display, in the identified region, image data of a previous frame of image data, wherein the means for causing the destination device to display the image data of the previous frame of video data prevents the destination device from displaying the second media element.

39. The device of claim 38, further comprising:
means for determining the at least one parameter is based on user input.

40. The device of claim 39, further comprising:
means for determining the at least one parameter based on previously received user input stored in memory.

41. The device of claim 39, further comprising:
means for dynamically determining user input received in response to receiving the second media element.

42. The device of claim 41, further comprising:
means for, in response to receiving the second media element from at least one software application, providing a user with a user interface that enables the user to indicate whether to control the destination device to mirror the second media element.

43. The device of claim 41, further comprising:
means for causing the destination device to not mirror the second media element until it is determined whether to mirror the second media element based on the at least one parameter.

44. A method of encoding a frame of video data, the method comprising:
determining whether to cause a destination device to mirror a media element based on at least one parameter associated with the media element;
identifying at least one region of a frame of video data that corresponds to the media element;
assigning one of a plurality of prediction modes to each block of a plurality of blocks of video data in the video frame that reside outside of the identified at least one region; and
in response to determining to cause the destination device to not mirror the media element, assigning a skip prediction mode to each of the plurality of blocks within the identified at least one region; and
outputting the frame of video data to the destination device to cause the identified at least one region to be visually frozen in the frame when the frame is output via the destination device.

45. The method of claim 44, assigning one of a plurality of prediction modes to a plurality of blocks of video data outside of the identified region assigning one or more prediction modes selected from the group consisting of:
a split mode;
the skip mode;
a direct mode;
an intra mode; and
an inter mode.

46. The method of claim 44, wherein identifying the at least one region of the frame of video data comprises identifying the at least one region to prevent the media element from being mirrored via the destination device along with other media native to the source device.

47. The method of claim 44, further comprising:
assigning a skip prediction mode to each of the plurality of blocks within the at least one region comprises assigning the skip prediction mode to each of the blocks regardless of whether there are any differences between a respective block and a predictive block that may be used by a decoder to reconstruct the respective block.

48. A device configured to encode a frame of video data, comprising;
a mirroring module configured to:
determine whether to cause a destination device to mirror a media element based on at least one parameter associated with the media element;
identify at least one region of a frame of video data that corresponds to the media element; and
a video encoder configured to:
assign one of a plurality of prediction modes to each block of a plurality of blocks of video data outside of the identified at least one region; and
in response to determining to cause the destination device to not mirror the media element, assign a skip prediction mode to each of the plurality of blocks within the identified at least one region; and
output the frame of video data to the destination device to cause the identified at least one region to be visually frozen in the frame when the frame is output via the destination device.

49. The device of claim 48, wherein the video encoder is configured to assign one of a plurality of prediction modes to a plurality of blocks of video data outside of the identified region selected from the group consisting of:
a split mode;
the skip mode;
a direct mode;
an intra mode; and
an inter mode.

50. The device of claim 48, wherein the mirroring module is further configured to identify the at least one region of the frame of video data based on identifying the at least one region to prevent media element device from being mirrored via the destination device along with other media native to the source device.

51. The device of claim 48, wherein the video encoder is further configured to:
assign a skip prediction mode to each of the plurality of blocks within the at least one region comprises assigning the skip prediction mode to each of the blocks regardless of whether there are any differences between a respective block and a predictive block that may be used by a decoder to reconstruct the respective block.

52. A non-transitory, computer-readable storage medium that stores instructions configured to cause a computing device to:
determine whether to cause a destination device to mirror a media element based on at least one parameter associated with the media element;
identify at least one region of a frame of video data that corresponds to the media element;
assign one of a plurality of prediction modes to each block of a plurality of blocks of video data outside of the identified at least one region;
in response to determining to cause the destination device to not mirror the media element, assign a skip prediction mode to each of the plurality of blocks within the identified at least one region; and
output the frame of video data to the destination device to cause the identified at least one region to be visually frozen in the frame when the frame is output via the destination device.

53. The non-transitory, computer-readable storage medium of claim 52, wherein the instructions further cause the computing device to:
assign one of a plurality of prediction modes to each of the plurality of blocks of video data outside of the identified region selected from the group consisting of:
a split mode;
the skip mode;
a direct mode;
an intra mode; and
an inter mode.

54. The non-transitory, computer-readable storage medium of claim 52, wherein the instructions further cause the computing device to:
identify the at least one region of the frame of video data to prevent the media element from being mirrored via the destination device along with other media native to the source device.

55. The non-transitory, computer-readable storage medium of claim 52, wherein the instructions further cause the computing device to:
assign the skip prediction mode to each of the blocks within the identified at least one region regardless of whether there are any differences between a respective block and a predictive block that may be used by a decoder to reconstruct the respective block.

56. A device configured to encode a frame of video data, comprising:
means for determining whether to cause a destination device to mirror a media element based on at least one parameter associated with the media element;
means for identifying at least one region of a frame of video data that corresponds to the media element;
means for assigning one of a plurality of prediction modes to each block of a plurality of blocks of video data outside of the identified at least one region; and
means for assigning a skip prediction mode to each of the plurality of blocks within the identified at least one region in response to determining to cause the destination device to not mirror the media element; and
means for outputting the frame of video data to the destination device to cause the identified at least one region to be visually frozen in the frame when the frame is output via the destination device.

* * * * *